United States Patent
Wang et al.

(10) Patent No.: US 10,926,208 B2
(45) Date of Patent: Feb. 23, 2021

(54) NANOFIBER WEB WITH CONTROLLABLE SOLID VOLUME FRACTION

(71) Applicant: 4C Air, Inc., Sunnyvale, CA (US)

(72) Inventors: Qiqi Wang, Santa Clara, CA (US); Lei Liao, Sunnyvale, CA (US); Yi Cui, Stanford, CA (US)

(73) Assignee: 4C Air, Inc., Sunnyvale, CA (US)

( * ) Notice: Subject to any disclaimer, the term of this patent is extended or adjusted under 35 U.S.C. 154(b) by 231 days.

(21) Appl. No.: 16/117,858

(22) Filed: Aug. 30, 2018

(65) Prior Publication Data
US 2019/0070538 A1 Mar. 7, 2019

Related U.S. Application Data

(60) Provisional application No. 62/554,313, filed on Sep. 5, 2017.

(51) Int. Cl.
*B01D 39/08* (2006.01)
*D04H 1/728* (2012.01)
(Continued)

(52) U.S. Cl.
CPC ......... *B01D 39/08* (2013.01); *B01D 39/1623* (2013.01); *B32B 5/24* (2013.01); *D04H 1/4382* (2013.01); *D04H 1/728* (2013.01); *D04H 3/016* (2013.01); *D04H 3/16* (2013.01); *D04H 5/06* (2013.01); *B01D 2239/025* (2013.01);
(Continued)

(58) Field of Classification Search
CPC ........ B01D 39/08; B01D 39/10; B01D 39/12; B01D 39/1623; B01D 39/546; B01D 2239/025; B01D 2239/0631; B01D 2239/1233; D04H 1/4382; D04H 1/728; D04H 3/016; D04H 3/16; D04H 5/06
See application file for complete search history.

(56) References Cited

U.S. PATENT DOCUMENTS 8,025,960 B2 9/2011 Dubrow et al.
8,231,013 B2 7/2012 Chu et al.
(Continued)

OTHER PUBLICATIONS

International Search Report and Written Opinion for PCT/US2018/048797 dated Oct. 12, 2018, 8 pages.

*Primary Examiner* — Jason M Greene
(74) *Attorney, Agent, or Firm* — Sheppard Mullin Richter &. Hampton LLP

(57) ABSTRACT

Disclosed herein are nanofiber structures, and methods of making and using the same. In some embodiments, provided is a porous sheet comprising a plurality of nanofibers in contact with a supporting structure comprising a plurality of supporting elements, wherein: the nanofibers have an average diameter of about 10-900 nm; the supporting elements have an average thickness less than, about equal to, or greater than that of the thickness of the nanofibers; the sheet has an average thickness that is about 75%-150% of an average thickness of the supporting elements; a total volume of the nanofibers is less than about 20% of a total volume of the porous sheet; and/or a total volume of the supporting structure is less than about 50% of the total volume of the porous sheet. In some embodiments, provided is a multilayer structure comprising one or more sections, where each section independently comprises one or more porous sheets as described herein.

14 Claims, 18 Drawing Sheets

(51) Int. Cl.
*D04H 5/06* (2006.01)
*D04H 1/4382* (2012.01)
*D04H 3/16* (2006.01)
*B01D 39/16* (2006.01)
*B32B 5/24* (2006.01)
*D04H 3/016* (2012.01)
*B82Y 30/00* (2011.01)
*B82Y 40/00* (2011.01)
*D01D 5/00* (2006.01)
*D06M 11/83* (2006.01)

(52) U.S. Cl.
CPC ............... *B01D 2239/0631* (2013.01); *B01D 2239/1233* (2013.01); *B82Y 30/00* (2013.01); *B82Y 40/00* (2013.01); *D01D 5/0061* (2013.01); *D06M 11/83* (2013.01)

(56) References Cited

U.S. PATENT DOCUMENTS

| | | | |
|---|---|---|---|
| 2004/0203306 A1 | 10/2004 | Grafe et al. | |
| 2010/0206803 A1* | 8/2010 | Ward | B01D 39/1623 210/491 |
| 2011/0174158 A1* | 7/2011 | Walls | B01D 39/1623 96/60 |
| 2012/0040581 A1* | 2/2012 | Kim | D04H 1/728 442/330 |
| 2014/0207248 A1* | 7/2014 | Wang | D04H 3/016 623/23.72 |
| 2015/0157971 A1* | 6/2015 | Tong | B01D 46/546 96/74 |
| 2016/0166959 A1* | 6/2016 | Cui | B01D 46/546 95/57 |

* cited by examiner

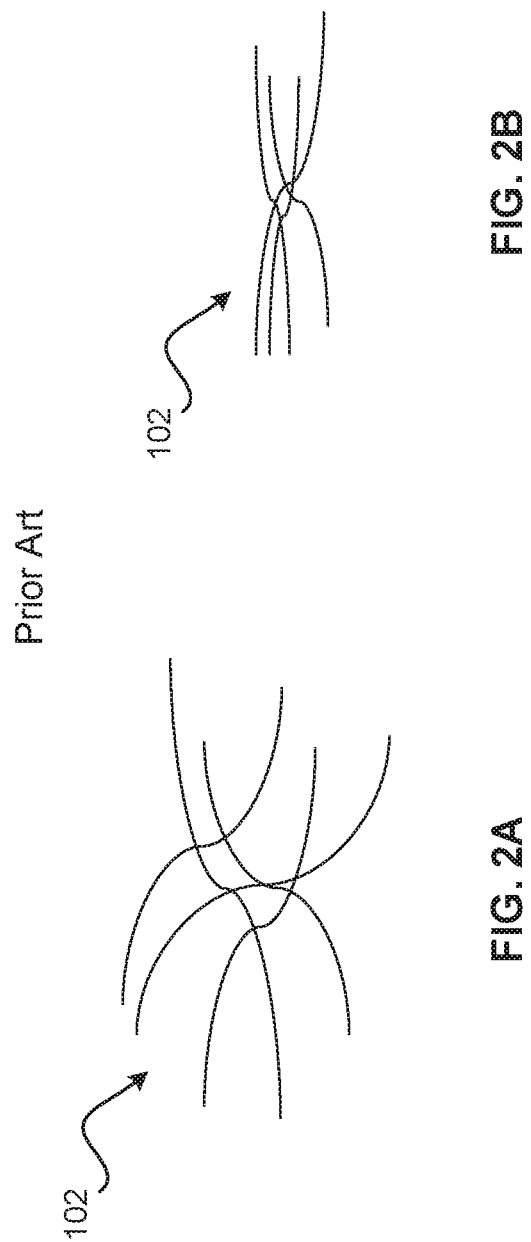

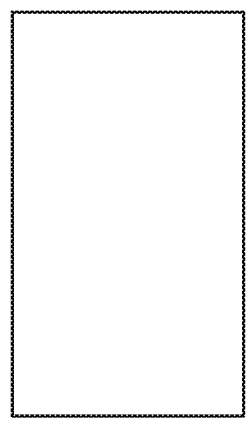
FIG. 5A
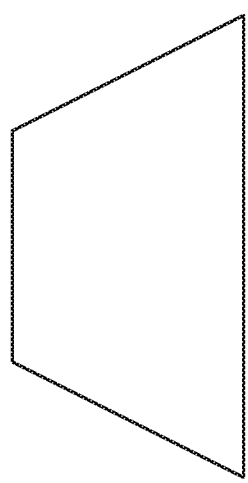
FIG. 5B
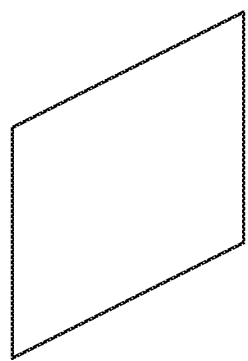
FIG. 5C
FIG. 5D
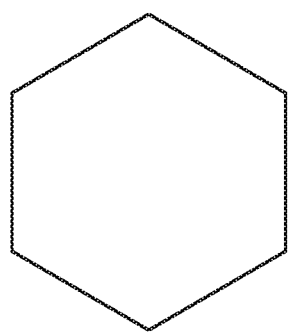
FIG. 5E
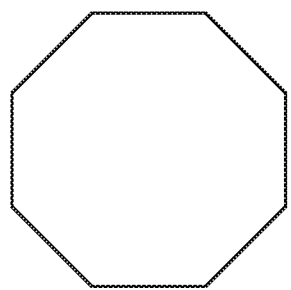
FIG. 5F
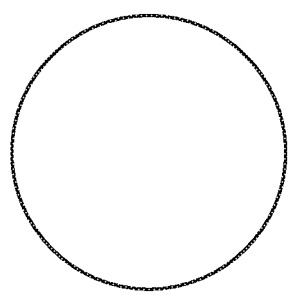
FIG. 5G
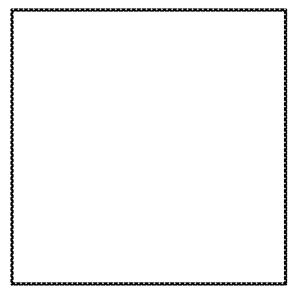
FIG. 5H

NANOFIBER WEB WITH CONTROLLABLE SOLID VOLUME FRACTION

CROSS REFERENCE TO RELATED APPLICATIONS

This application claims the benefit under 35 U.S.C. § 119(e) of U.S. Provisional Application Ser. No. 62/554,313, filed Sep. 5, 2017, the content of which is incorporated by reference in its entirety into the present disclosure.

BACKGROUND

Conventional nanofiber web structures are normally very weak and need to be supported by other fibrous media for application usage, such as spunbonded nonwoven substrates, fiber-glass mats, etc.

To permanently secure the nanofiber web on the fibrous media, a web formation process, such as calendering, is often used. FIGS. 1A-1B show an example of such a calendaring process in which an un-bonded nanofiber web 102 positioned on an upper (or lower surface) of a fibrous medium 104 (FIG. 1A) or between the fibrous medium 104 (FIG. 1B) is passed through the nip of two opposing rolls 106a, 106b pressed against each other at a predetermined pressure and/or temperature.

The calendering process, as shown, e.g., in FIGS. 1A-1B, will compact the whole structure, and thus increase the solid volume fraction of the nanofiber web 102. The solid volume fraction of the nanofiber web 102 may be defined as the ratio of the volume of the nanofibers to the volume of the whole structure. FIGS. 2A-2B provide an exploded view of the nanofiber web 102 having a first solid volume fraction (SV1) before calendering (FIG. 2A), and the resulting nanofiber web 102 having a second volume fraction (SV2) after calendering (FIG. 2B), where SV1 is less than SV2.

The solid volume fraction is one important factor in determining the performance/function of a nanofiber web structure. Convention nanofiber web structures, however, do not allow for precise control of the solid volume fraction of the nanofiber web.

SUMMARY

The present disclosure provides novel nanofiber web structures, as well as methods of making and using the same, wherein one or more properties of the structures, such as fiber diameter, basis weight, solid volume fraction, etc., are controllable.

Accordingly, in one embodiment, provided herein is a porous sheet comprising a plurality of nanofibers in contact with a supporting structure comprising a plurality of supporting elements, where: the nanofibers have an average diameter of about 10-900 nm; the supporting elements have an average thickness that is less than, about equal to, or greater than that of the thickness of the nanofibers; the sheet has an average thickness that is about 75%-150% of an average thickness of the supporting elements; a total volume of the nanofibers is less than about 20% of a total volume of the porous sheet; and/or a total volume of the supporting structure is less than about 50% of the total volume of the porous sheet.

In some embodiments, at least about 30% of the total volume of the porous sheet is empty.

In some embodiments, at least 85% of the nanofibers are present in the sheet closer to a surface of the sheet than the opposite surface of the sheet.

In some embodiments, the nanofibers are not substantially evenly distributed between adjacent parallel supporting elements.

In some embodiments, the nanofibers are prepared by a method selected from electrospinning, melt blowing, gas blowing, force spinning, and combinations thereof.

In some embodiments, the nanofibers are disposed onto one side of the supporting structure.

In some embodiments, the supporting structure has a shape of a mesh. In some embodiments, parallel supporting elements in the mesh have an average distance that is at least about one time of the thickness of the supporting elements.

In some embodiments, each supporting element independently forms a shape selected from a circle, a triangle, a parallelogram, an echelon, a hexagon, an octagon, an irregular shape, or combinations thereof.

Also provided, in one embodiment, is a porous sheet, comprising a mesh structure comprising a first plurality of pores and a polymeric nanofiber web in contact with the mesh structure, where the polymeric nanofiber web comprises a second plurality of pores, and at least a portion of the nanofiber web is located within the first plurality of pores of the mesh structure.

In some embodiments, the mesh structure comprises a plurality of interconnected support elements defining the first plurality of pores.

In some embodiments, the support elements are comprised of a metal material, a plastic material, a ceramic material, a fibrous material, or combinations thereof.

In some embodiments, the support elements have an average diameter ranging from about 30 um to about 3 mm.

In some embodiments, the mesh structure has an average pore size that is at least one times that of the thickness of the mesh structure. In some embodiments, the average pore size of the mesh structure is in a range from about 0.01 mm$^2$ to about 100 cm$^2$.

In some embodiments, each pore of the first plurality of pores has a shape selected from a circle, a triangle, a parallelogram, an echelon, a hexagon, an octagon, and an irregular shape.

In some embodiments, the nanofiber web comprises a plurality of interconnected polymeric nanofibers defining the second plurality of pores. In some embodiments, the nanofiber web has a smaller average pore size than that of the mesh structure.

In some embodiments, the polymeric nanofibers comprise an average diameter of about 10 to 900 nm.

In some embodiments, some of the polymeric nanofibers comprise one or more polar functional groups.

In some embodiments, the polymeric nanofibers comprise nylon, polyvinyl alcohol, polyvinylpyrrolidone, polyvinylidene fluoride, polystyrene, polypropylene, polyethylene, polyacrylonitrile, polyimide, poly(ethylene oxide), polyethylene terephthalate, polyvinyl chloride, polycarbonate, polyurethane, polysulfone, polyactic acid, polytetrafluoroethylene, polybenzoxazoles, poly-aramid, poly(phenylene sulfide), poly-phenylene terephthalamide, polytetrafluoroethylene, or combinations thereof.

In some embodiments, the nanofiber web comprises a solid volume fraction less than 20%.

In some embodiments, the porous sheet has a thickness in a range from about 30 um to 6 mm.

Also provided, in one embodiment, is an apparatus comprising one or more porous sheets as described herein. In some embodiments, the apparatus comprises at least two porous sheets as described herein.

Also provided, in one embodiment, is an apparatus comprising a substrate having a surface, and one or more porous sheets as described herein positioned on the surface of the substrate.

Also provided, in one embodiment, is a method for forming a porous sheet, where the method comprises contacting a plurality of nanofibers with a supporting structure comprising a plurality of supporting elements, where: the nanofibers have an average diameter of about 10-900 nm; the supporting elements have an average thickness that is about at least one times that of the thickness of the nanofibers; the sheet has an average thickness that is about 75%-150% of the average thickness of the supporting elements; the total volume of the nanofibers is less than about 20%; and/or the total volume of the supporting structure is less than about 50 of the total volume of the porous sheet.

In some embodiments, the method further comprising forming the plurality of nanofibers via electrospinning, melt blowing, gas blowing, force spinning, or combinations thereof. In some embodiments, the supporting structure has a shape of a mesh.

Also provided, in one embodiment, is a multi-layer porous structure, comprising one or more areas, each area comprising a plurality of layers vertically arranged relative to one another and a plurality of nanofibers disposed within at least a portion of the porous material of at least one of the layers. Each layer comprises a porous material having a total volume that is less than about 50% of a total volume of the layer. Further, for each layer comprising nanofibers, a total volume of the nanofibers is less than about 20% of the total volume of the layer.

In some embodiments, the porous material of each layer of the multi-layer porous structure comprises pores, each pore independently having a shape selected from a circle, a triangle, a parallelogram, an echelon, a hexagon, an octagon, and an irregular shape.

In some embodiments, at least one of the layers of the multi-layer porous structure does not comprises nanofibers.

In some embodiments, the multi-layer porous structure comprises a plurality of the areas horizontally arranged relative to one another.

In some embodiments, the porous material of each layer of the multi-layer porous structure is independently comprised of a woven or nonwoven material.

In some embodiments, the porous material of at least one of the layers of the multi-layer porous structure is comprised of a nonwoven material. In some embodiments, the nonwoven material is prepared by a method selected from spun bonding, melt blowing, needle punching, air-laying, spun-lacing, and combinations thereof.

BRIEF DESCRIPTION OF THE DRAWINGS

Exemplary and non-limiting embodiments of the inventions may be more readily understood by referring to the accompanying drawings, in which:

FIGS. 2A-2B show cross-sectional views of a nanofiber web having a first solid volume fraction (SV1) before calendering (FIG. 2A), and the resulting nanofiber web having a second volume fraction (SV2) after calendering (FIG. 2B), where SV1 is less than SV2.

FIGS. 5A-5H show exemplary cross-sectional shapes that pores of a porous sheet, as described herein, may take.

DETAILED DESCRIPTION

The present disclosure provides novel nanofiber web structures, as well as methods of making and using the same. One or more properties of these novel nanofiber web structures, such as fiber diameter, basis weight, solid volume fraction, etc., are independently controllable to a degree not present in the current art, thereby allowing for formation of structures comprising a desired performance/function.

Figure 1A:
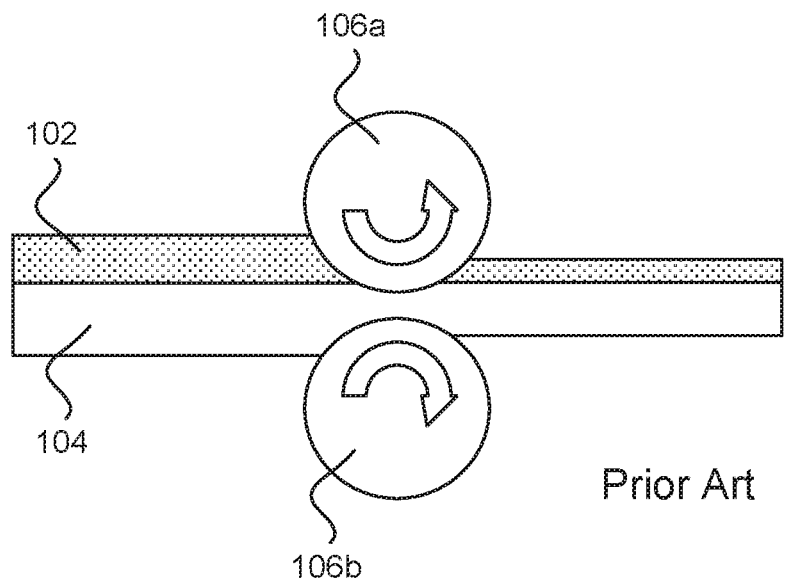
FIGS. 1A-1B show a schematic of a compaction process, such as calendering, for forming a nanofiber web structure.
Figure 1B:
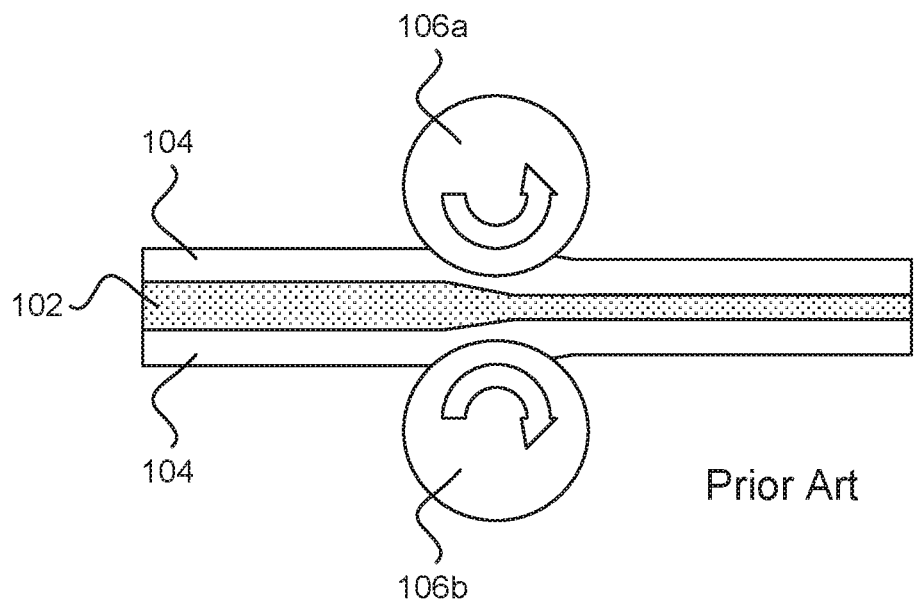
Figure 3:
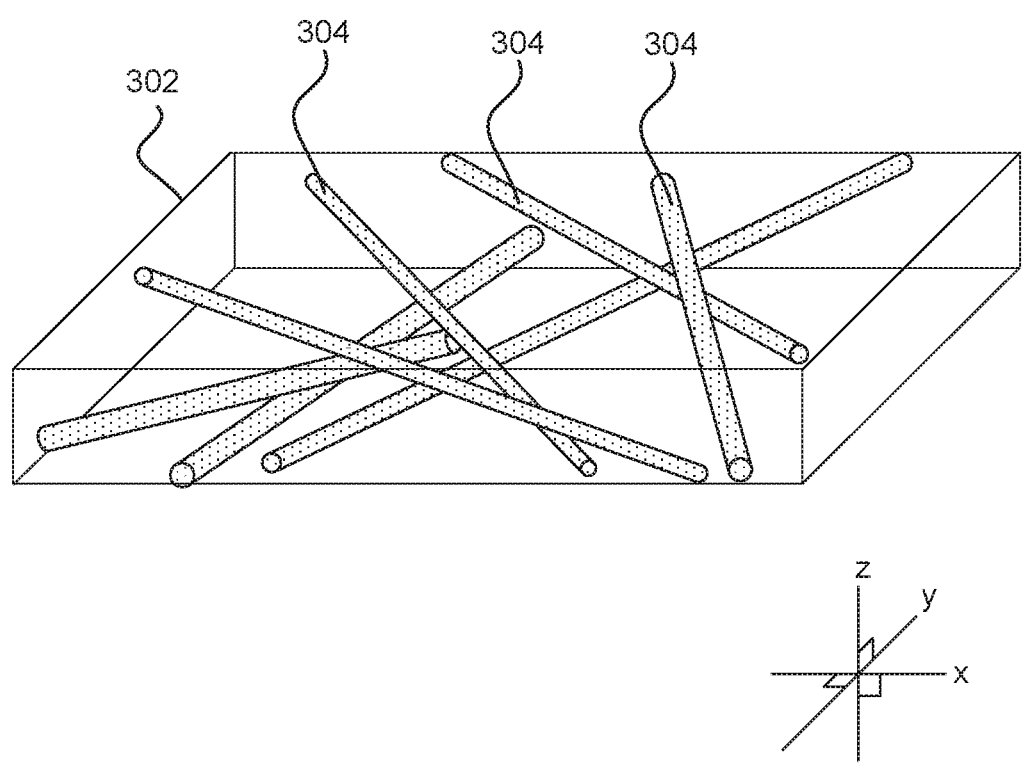
FIG. 3 shows an isometric view of a nanofiber web structure according to one embodiment.

The definition of solid volume fraction (SVF) of a nanofiber web can be understood, e.g., with reference to FIG. 3. For instance, FIG. 3 shows a structure 302 and a plurality of nanofibers 304 in contact therewith. The plurality of nanofibers 304 may be collectively referred to herein, in some embodiments, as a nanofiber web. The SVF of the plurality of nanofibers 304 may be defined as:

$$SVF = \Sigma \text{nanofibers'}(304)\text{volume} / \text{structure's}(302)\text{volume}.$$

Figure 4:
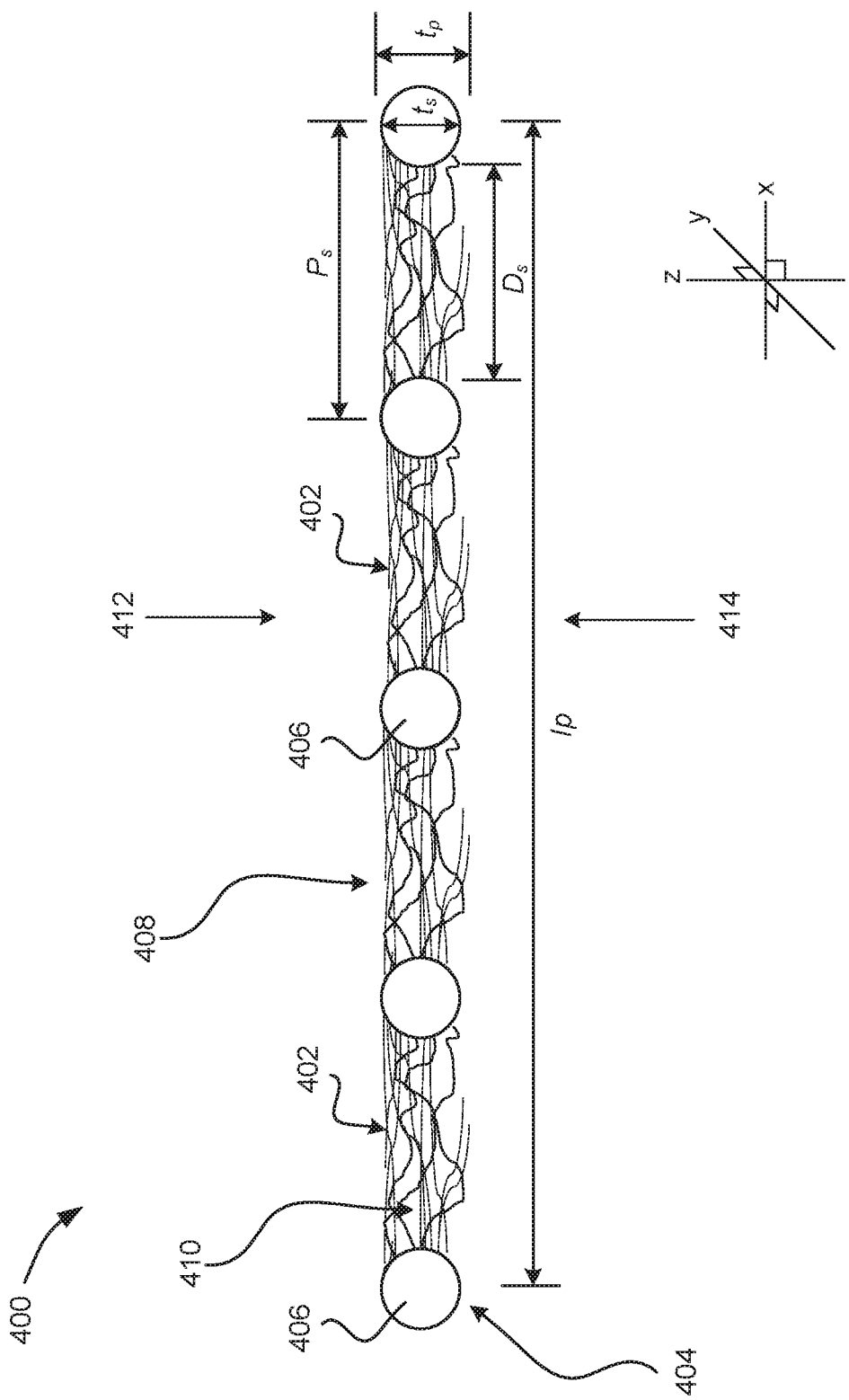
FIG. 4 shows a cross-sectional, side view of a porous sheet comprising a plurality of nanofibers in contact with a supporting structure, according to one embodiment.

Referring now to FIG. 4, a cross-sectional, side view of a porous sheet 400 is shown in accordance with one embodiment. The porous sheet 400 or components/features thereof may be implemented in combination with, or as an alternative to, other devices/features/components described herein, such as those described with reference to other embodiments and FIGS. The porous sheet 400 may additionally be utilized in any of the methods for making and/or using such devices/components/features described herein. The porous sheet 400 may also be used in various applications and/or in permutations, which may or may not be noted in the illustrative embodiments described herein. For instance, the porous sheet 400 may include more or less features/components than those shown in FIG. 4, in some embodiments. Moreover, the porous sheet 400 is not limited to the size, shape, number of components/features, etc. specifically shown in FIG. 4.

As shown in FIG. 4, the porous sheet 400 comprises a plurality of nanofibers 402 in contact with a supporting structure 404 comprising a plurality of supporting elements 406. In some embodiments, the porous sheet 400 may have an average thickness, $t_p$, that is about 75% to about 150% of an average thickness, $t_s$, of the supporting elements 406. In some embodiments, the porous sheet 400 may have an average thickness, $t_p$, that is about 100% to about 150% of an average thickness, $t_s$, of the supporting elements 406. In some embodiments, the porous sheet 400 may have an average thickness, $t_p$, that is about 100% of an average thickness, $t_s$, of the supporting elements 406. In some embodiments, the porous sheet 400 may have an average thickness, $t_p$, that is about 125% of an average thickness, $t_s$, of the supporting elements 406. In some embodiments, the porous sheet 400 may have an average thickness, $t_p$, that is about 150% of an average thickness, $t_s$, of the supporting elements 406.

In some embodiments, the porous sheet 400 may have an average thickness, $t_p$, that is in a range from about from about 30 µm to about 10 mm, about 50 µm to about 6 mm, or from about 100 µm to about 2 mm. In some embodiments, the porous sheet 400 may have an average thickness, $t_p$, that is in a range including and between any two of the following: about 30 µm, about 50 µm, about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, and about 10 mm.

In some embodiments, at least about 30% to about 90% of the total volume of the porous sheet 400 may be empty. In some embodiments, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90% of the total volume of the porous sheet 400 may be empty. In some embodiments, at least about 30%, at least about 60%, or at least about 90% of the total volume of the porous sheet 400 may be empty. In some embodiments, at least about 30% of the total volume of the porous sheet 400 may be empty. In some embodiments, at least about 60% of the total volume of the porous sheet 400 may be empty. In some embodiments, at least about 90% of the total volume of the porous sheet 400 may be empty.

In some embodiments, a total volume of the supporting structure 404 may be less than about 30% to about 50% of the total volume of the porous sheet 400. In some embodiments, a total volume of the supporting structure 404 may be less than about 30%, less than about 32%, less than about 34%, less than about 36%, less than about 38%, less than about 40%, less than about 42%, less than about 44%, less than about 46%, less than about 48%, or less than about 50% of the total volume of the porous sheet 400. In some embodiments, a total volume of the supporting structure 404 may be less than about 30%, less than about 40%, or less than about 50% of the total volume of the porous sheet 400. In some embodiments, a total volume of the supporting structure 404 may be less than about 30% of the total volume of the porous sheet 400. In some embodiments, a total volume of the supporting structure 404 may be less than about 40% of the total volume of the porous sheet 400. In some embodiments, a total volume of the supporting structure 404 may be less than about 50% of the total volume of the porous sheet 400.

In some embodiments, the supporting structure 404 and its respective supporting elements 406 may be comprised of a woven or non-woven material. In some embodiments, the supporting structure 404 and its respective supporting elements 406 may be comprised of a woven material. In some embodiments, the supporting structure 404 and its respective supporting elements 406 may be comprised of a non-woven material.

In some embodiments, the supporting elements 406 of the supporting structure 404 may be comprised of a metal material, a plastic material, a ceramic material, a fibrous material, or combinations thereof.

In some embodiments, the supporting elements 406 may each independently have a substantially circular, substantially rectangular, etc. cross-sectional shape (where said cross-section is taken perpendicular to the y axis as shown in FIG. 4). In some embodiments, the supporting elements 406 may each independently have a shape as exemplified in FIGS. 5A-5H, such as a rectangle (FIG. 5A), a triangle (FIG. 5B), a parallelogram (FIG. 5C), an echelon (FIG. 5D), a hexagon (FIG. 5E), an octagon (FIG. 5F), a circle (FIG. 5G), a square (FIG. 5H), or an irregular shape (not shown).

In some embodiments, at least two of the supporting elements 406 may have the same shape as one another. In some embodiments, each of the supporting elements 406 may have the same shape as one another.

In some embodiments, at least two of the supporting elements 406 may have different shapes as one another. In some embodiments, each of the supporting elements 406 may have a different shape as another.

As shown in FIG. 4, the supporting elements 406 of the supporting structure 404 define a plurality of pores 408 in which substantially all of the nanofibers 402 are disposed. In some embodiments, a maximum distance, $D_s$, between each of the opposing and adjacent supporting elements 406 may be less than, about equal to, or greater than the thickness, $t_s$, of the supporting structure 404. In some embodiments, a maximum distance, $D_s$, between each of the opposing and adjacent supporting elements 406 may be less than the thickness, $t_s$, of the supporting structure 404. In some embodiments, a maximum distance, $D_s$, between each of the opposing and adjacent supporting elements 406 may be about equal to the thickness, $t_s$, of the supporting structure 404. In some embodiments, a maximum distance, $D_s$, between each of the opposing and adjacent supporting elements 406 may be greater than the thickness, $t_s$, of the supporting structure 404. In some embodiments, a maximum distance, $D_s$, between each of the opposing and adjacent supporting elements 406 may be at least one times that of the thickness, $t_s$, of the supporting structure 404.

In some embodiments, a maximum distance, $D_s$, between each of the opposing and adjacent supporting elements 406 may be range from about 0.1 mm to about to about 10 cm, about 0.3 mm to about 5 cm, or about 0.5 mm to about 4 cm. In some embodiments, a maximum distance, $D_s$, between each of the opposing and adjacent supporting elements 406 may be range including and between any two of the following: about 0.1 mm, about 0.2 mm, about 0.4 mm, about 0.6 mm, about 0.8 mm, about 1 mm, about 2 mm, about 4 mm, about 6 mm, about 8 mm, about 1 cm, about 2 cm, about 3 cm, about 4 cm, about 5 cm, about 6 cm, about 7 cm, about 8 cm, about 9 cm, and about 10 cm.

In some embodiments opposing and adjacent supporting elements 406 may be in parallel spaced relation with one another. Such may occur, for instance, where the pores 408 may each independently have a substantially square, rectangular, parallelogram, etc. shape (where said cross-section is taken perpendicular to the z-axis as shown in FIG. 4).

In some embodiments, an average distance, $D_s$, between each of the opposing and adjacent supporting elements 406 may be less than, about equal to, or greater than the thickness, $t_s$, of the supporting structure 404. In some embodiments, an average distance, $D_s$, between each of the opposing and adjacent supporting elements 406 may be less than the thickness, $t_s$, of the supporting structure 404. In some embodiments, an average distance, $D_s$, between each of the opposing and adjacent supporting elements 406 may be about equal to the thickness, $t_s$, of the supporting structure 404. In some embodiments, an average distance, $D_s$, between each of the opposing and adjacent supporting elements 406 may be greater than the thickness, $t_s$, of the supporting structure 404. In some embodiments, an average distance, $D_s$, between opposing and adjacent supporting elements 406 may be at least one times that of the thickness, $t_s$, of the supporting structure 404.

In some embodiments, an average distance, $D_s$, between opposing and adjacent supporting elements 406 may be range from about 0.1 mm to about to about 10 cm, about 0.3 mm to about 5 cm, or about 0.5 mm to about 4 cm. In some embodiments, an average distance, $D_s$, between opposing and adjacent supporting elements 406 may be range including and between any two of the following: about 0.1 mm, about 0.2 mm, about 0.4 mm, about 0.6 mm, about 0.8 mm, about 1 mm, about 2 mm, about 4 mm, about 6 mm, about 8 mm, about 1 cm, about 2 cm, about 3 cm, about 4 cm, about 5 cm, about 6 cm, about 7 cm, about 8 cm, about 9 cm, or about 10 cm.

In some embodiments, a maximum pitch, $P_s$, (e.g., center-to-center distance) between each of the opposing and adjacent supporting elements 406 may be in a range from about 0.1 mm to about to about 20 cm, about 0.3 mm to about 10 cm, or about 0.5 mm to about 6 cm. In some embodiments, a maximum pitch, $P_s$, between each of the opposing and adjacent supporting elements 406 may be range including and between any two of the following: about 0.1, about 0.2 mm, about 0.4 mm, about 0.6 mm, about 0.8 mm, about 1 mm, about 2 mm, about 4 mm, about 6 mm, about 8 mm, about 1 cm, about 2 cm, about 3 cm, about 4 cm, about 5 cm, about 6 cm, about 7 cm, about 8 cm, about 9 cm, or about 10 cm, about 11 cm, about 12 cm, about 13 cm, about 14 cm, about 15 cm, about 16 cm, about 17 cm, about 18 cm, about 19 cm, and about 20 cm.

In some embodiments, an average pitch, $P_s$, (e.g., center-to-center distance) between opposing and adjacent supporting elements 406 may be in a range from about 0.1 mm to about to about 20 cm, about 0.3 mm to about 10 cm, or about 0.5 mm to about 6 cm. In some embodiments, an average pitch, $P_s$, between opposing and adjacent supporting elements 406 may be range including and between any two of the following: about 0.1, about 0.2 mm, about 0.4 mm, about 0.6 mm, about 0.8 mm, about 1 mm, about 2 mm, about 4 mm, about 6 mm, about 8 mm, about 1 cm, about 2 cm, about 3 cm, about 4 cm, about 5 cm, about 6 cm, about 7 cm, about 8 cm, about 9 cm, or about 10 cm, about 11 cm, about 12 cm, about 13 cm, about 14 cm, about 15 cm, about 16 cm, about 17 cm, about 18 cm, about 19 cm, and about 20 cm.

In some embodiments, the porous sheet 400 may have a length, $l_p$, defined by a number of repeatable sections, each of which has an average pitch, $P_s$. For instance, the length, $l_p$, of the porous sheet may be about equal to N number of sections of $P_s$, where N is at least one, at least two, at least 5, at least 10, at least 15, at least 20, at least 25, at least 50, at least 75, at least 100, at least 150, at least 200, at least 250, at least 300, at least 350, at least 400, at least 500, at least 600, at least 700, at least 800, at least 900, at least 1000, at least 1200, at least 1400, at least 1600, at least 1800, at least 2000, at least 2200, at least 2400, at least 2600, at least 2800, at least 3000, at least 3200, at least 3400, at least 3600, at least 3800, at least 4000, at least 4200, at least 4400, at least 4600, at least 4800, at least 5000, etc. In some embodiments, the porous sheet 400 may have a width, $W_p$, (not shown) that is less than, about equal to, or greater than the length, $l_p$, of the porous sheet 400.

In some embodiments, each of the pores 408 may independently comprise a pore size that is at least one times that of the thickness of the supporting structure 404. In some embodiments, each of the pores 408 may independently comprise a pore size in a range from about 0.01 mm$^2$ to about 100 cm$^2$, about 0.1 mm$^2$ to about 25 cm$^2$, or about 0.25 mm$^2$ to about 16 cm$^2$. In some embodiments, each of the pores 408 may independently comprise a pore size in a range including and between any two of the following: about 0.01 mm$^2$, about 0.05 mm$^2$, about 0.1 mm$^2$, about 0.5 mm$^2$, about 1 mm$^2$, about 2 mm$^2$, about 4 mm$^2$, about 6 mm$^2$, about 8 mm$^2$, about 1 cm$^2$, about 5 cm$^2$, about 10 cm$^2$, about 15 cm$^2$, about 20 cm$^2$, about 25 cm$^2$, about 30 cm$^2$, about 35 cm$^2$, about 40 cm$^2$, about 45 cm$^2$, about 50 cm$^2$, about 55 cm$^2$, about 60 cm$^2$, about 65 cm$^2$, about 70 cm$^2$, about 75 cm$^2$, about 80 cm$^2$, about 85 cm$^2$, about 90 cm$^2$, about 95 cm$^2$, and about 100 cm$^2$.

In some embodiments, the average size of the pores 408 may be at least one times that of the thickness of the supporting structure 404. In some embodiments, the average size of the pores 408 may be in a range from about 0.01 mm$^2$ to about 100 cm$^2$, about 0.1 mm$^2$ to about 25 cm$^2$, or about 0.25 mm$^2$ to about 16 cm$^2$. In some embodiments, the average size of the pores 408 may be in a range including and between any two of the following: about 0.01 mm$^2$, about 0.05 mm$^2$, about 0.1 mm$^2$, about 0.5 mm$^2$, about 1 mm$^2$, about 2 mm$^2$, about 4 mm$^2$, about 6 mm$^2$, about 8 mm$^2$, about 1 cm$^2$, about 5 cm$^2$, about 10 cm$^2$, about 15 cm$^2$, about 20 cm$^2$, about 25 cm$^2$, about 30 cm$^2$, about 35 cm$^2$, about 40 cm$^2$, about 45 cm$^2$, about 50 cm$^2$, about 55 cm$^2$, about 60 cm$^2$, about 65 cm$^2$, about 70 cm$^2$, about 75 cm$^2$, about 80 cm$^2$, about 85 cm$^2$, about 90 cm$^2$, about 95 cm$^2$, and about 100 cm$^2$.

In some embodiments, each pore 408 may independently have a substantially rectangular or square cross sectional shape (where said cross-section is taken perpendicular to the z axis as shown in FIG. 4). In some embodiments, each pore 408 may independently have a shape as exemplified in FIGS. 5A-5H, such as a rectangle (FIG. 5A), a triangle (FIG. 5B), a parallelogram (FIG. 5C), an echelon (FIG. 5D), a hexagon (FIG. 5E), an octagon (FIG. 5F), a circle (FIG. 5G), a square (FIG. 5H), or an irregular shape (not shown).

In some embodiments, at least two of the pores 408 may have the same shape as one another. In some embodiments, each of the pores 408 may have the same shape as one another.

In some embodiments, at least two of the pores 408 may have different shapes as one another. In some embodiments, each of the pores 408 may have a different shape as another.

With continued reference to FIG. 4, each of the supporting elements 406, in some embodiments, may independently have a thickness (or diameter), $t_s$, that is less than, about equal to, or greater than the average thickness (or diameter) of the nanofibers 402. In some embodiments, each of the supporting elements 406, in some embodiments, may independently have a thickness (or diameter), $t_s$, that is less than the average thickness of the nanofibers 402. In some embodiments, each of the supporting elements 406, in some embodiments, may independently have a thickness (or diameter), $t_s$, that is about equal to the average thickness of the nanofibers 402. In some embodiments, each of the supporting elements 406, in some embodiments, may independently have a thickness (or diameter), $t_s$, that is greater than the average thickness of the nanofibers 402.

In some embodiments, each of the supporting elements 406, in some embodiments, may independently have a thickness (or diameter), $t_s$, that is at least about one times that of the average thickness (or diameter) of the nanofibers 402. In some embodiments, each of the supporting elements 406 may independently have a thickness, $t_s$, that is at least two times that of the average thickness (or diameter) of the nanofibers 402.

In some embodiments, each of the supporting elements 406 may independently have thickness (or diameter), $t_s$, that is in a range from about 30 µm to about 10 mm, about 50 µm to about 6 mm, or from about 100 µm to about 2 mm. In some embodiments, each of the supporting element 406 may independently have a thickness (or diameter), $t_s$, in a range including and between any two of the following: about 30 µm, about 50 µm, about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, about 1 mm, about 1.5 mm, about 2 mm, about 2.5 mm, about 3 mm, about 4 mm, about 5 mm, about 6 mm, about 7 mm, about 8 mm, about 9 mm, and about 10 mm.

In some embodiments, the average thickness (or diameter) of the supporting elements 406 may be less than, about equal to, or greater than the average thickness (or diameter) of the nanofibers 402. In some embodiments, the average thickness (or diameter) of the supporting elements 406 may be at least about one times that of the average thickness (or diameter) of the nanofibers 402. In some embodiments, the average thickness (or diameter) of the supporting elements 406 may be at least about two times that of the average thickness (or diameter) of the nanofibers 402. In some embodiments, the average thickness (or diameter) of the supporting elements 406 may be in a range from about 30 µm to about 10 mm, about 50 µm to about 6 mm, or from about 100 µm to about 2 mm.

In some embodiments, at least two of the supporting elements 406 may have the same thickness (or diameter) as one another. In some embodiments, each of the supporting elements 406 may have the same thickness (or diameter) as one another.

In some embodiments, at least two of the supporting elements 406 may have a different thickness (diameter) as one another. In some embodiments, each of the supporting elements 406 may have a different thickness (diameter) as one another.

Figure 6A:
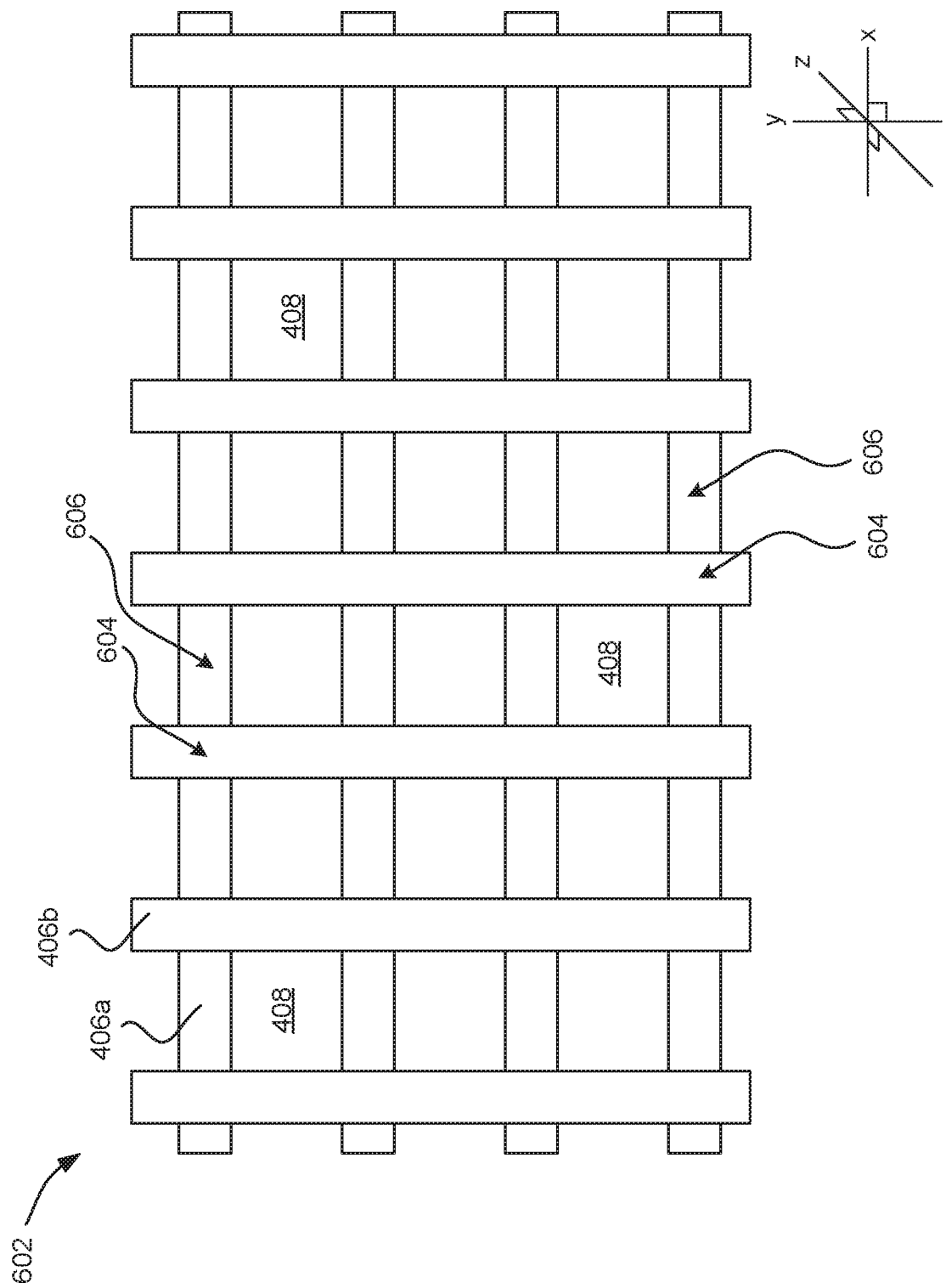
FIG. 6A shows a top down view of a porous sheet comprising a plurality of nanofibers in contact with a supporting structure, where the supporting structure is a mesh, according to one embodiment.
Figure 6B:
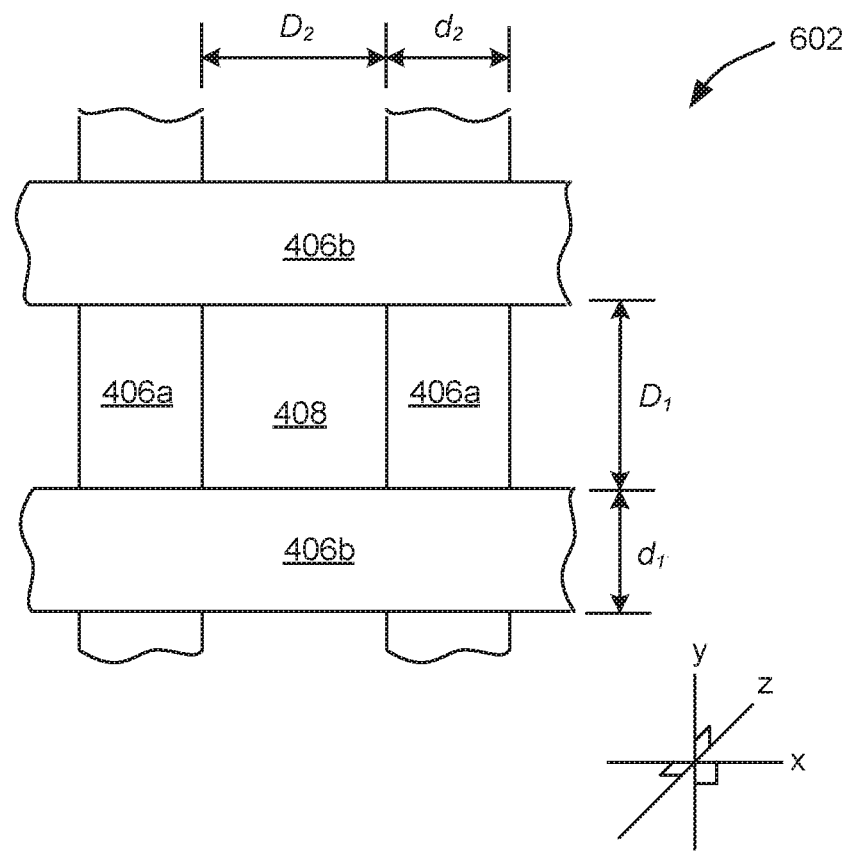
FIG. 6B shows a top down view of a single pore of the porous sheet of FIG. 6A, and FIGS. 6C-6D show cross-sectional views of the single pore.
Figure 6C:
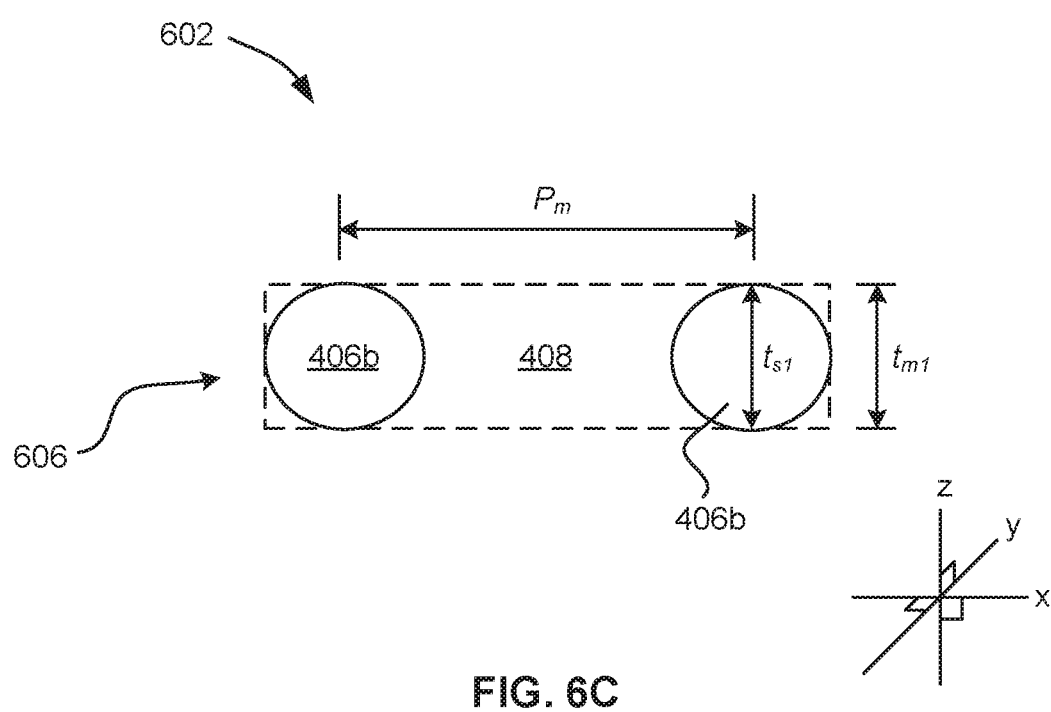
FIG. 6E additionally provides a cross-sectional view of the single pore, after the porous sheet of FIG. 6A is subjected to a compaction process (e.g., calendering), as described herein. The plurality of nanofibers are omitted merely for clarity in FIGS. 6A-6E.
FIG. 6F shows a top down view of a porous sheet comprising a plurality of nanofibers in contact with a supporting structure, where the supporting structure is a woven structure according to one embodiment.
FIG. 6G shows a top down view of a single pore of the porous sheet of FIG. 6F, and FIGS. 6H-6I show cross-section views of the single pore.
FIG. 6J additionally provides a cross-sectional view of the single pore, after the porous sheet of FIG. 6F is subjected to a compaction process (e.g., calendering), as described herein. The plurality of nanofibers are omitted for clarity in FIGS. 6F-6J.
Figure 6D:
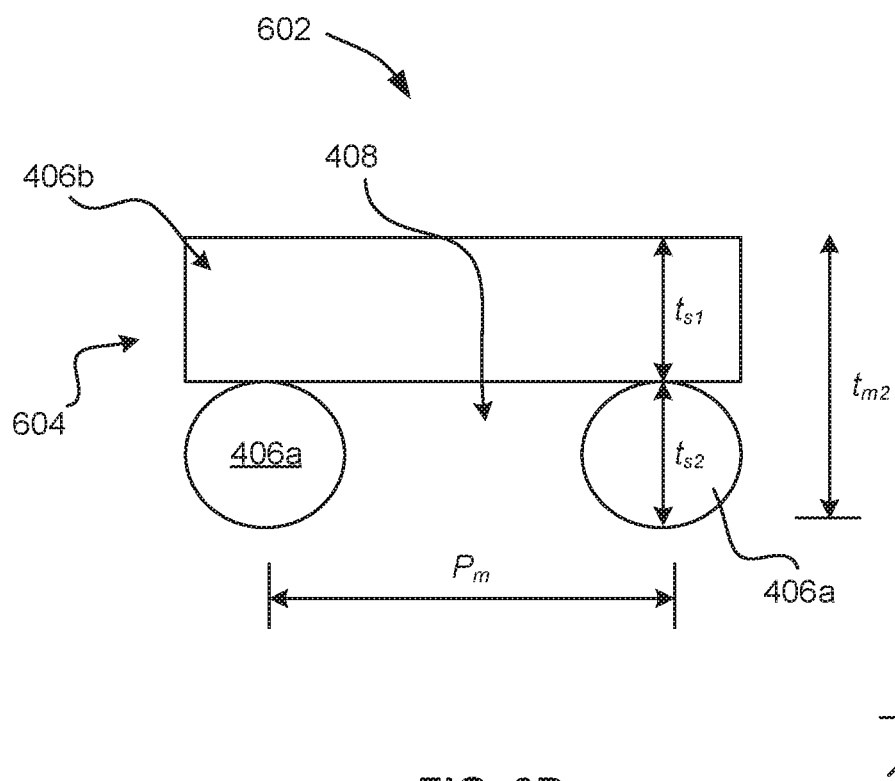

In some embodiments, the supporting structure 404 may be a mesh. FIG. 6A provides a top down view of the porous sheet 400 having such a mesh 602. In the embodiment of FIG. 6A each pore 408 of the mesh 602 may have a substantially square cross-sectional shape defined by two pairs of opposing and parallel support members 406a, 406b (where said cross-section is taken perpendicular to the z-axis of FIG. 6A). An exploded, top down view of a single pore 408 of the mesh 602 is provided in FIG. 6B, and exploded side views of said pore 408 are provided in FIGS. 6C-6D. It is of note that the plurality of nanofibers 402 is not shown in FIG. 6A-6D merely for clarity.

The mesh 602 comprises intersection areas 604 were adjacent, perpendicular support elements 406a, 406b meet/intersect. In the embodiment of FIGS. 4A-4D, support elements 406b (e.g., those arranged substantially parallel to the y axis) are positioned above support elements 406a (e.g., those arranged substantially parallel to the x axis). It is of note, however, that in other embodiments, support elements 406b may be positioned below support elements 406a. In yet other embodiments, support elements 406b may not be positioned above or below support elements 406a, but rather may be connected at the intersection points within the same plane x-y plane. In some embodiments, alternating support elements 406b may be above and below support elements 406a, as shown, e.g., in FIGS. 6F-6H, which are described in detail later.

With continued reference to FIGS. 6A-6D, in some embodiments, the distance between a first pair of opposing, parallel supporting elements 406a may define a length, $D_1$, of the respective pore 408, and the distance between a second pair of opposing, parallel supporting elements 406b may define a width, $D_2$, of said pore 408. In some embodiments, $D_1$ and/or $D_2$ may each independently be less than, about equal to, or greater than the thickness, $t_s$, of the supporting elements. In some embodiments, $D_1$ and/or $D_2$ may each independently be less than, the thickness, $t_s$, of the supporting elements. In some embodiments, $D_1$ and/or $D_2$ may each independently be about equal to the thickness, $t_s$, of the supporting elements. In some embodiments, $D_1$ and/or $D_2$ may each independently be greater than the thickness, $t_s$, of the supporting elements. In some embodiments, $D_1$ and/or $D_2$ may each independently be at least about one times that of the thickness, $t_s$, of the supporting elements.

In some embodiments, $D_1$ and/or $D_2$ may each independently be in a range from about 0.1 mm to about to about 10 cm, about 0.3 mm to about 5 cm, or about 0.5 mm to about 4 cm. In some embodiments, $D_1$ and/or $D_2$ may each independently be in a range including and between any two of the following: about 0.1 mm, about 0.2 mm, about 0.4 mm, about 0.6 mm, about 0.8 mm, about 1 mm, about 2 mm, about 4 mm, about 6 mm, about 8 mm, about 1 cm, about 2 cm, about 3 cm, about 4 cm, about 5 cm, about 6 cm, about 7 cm, about 8 cm, about 9 cm, or about 10 cm.

As noted above, in the embodiment of FIGS. 6A-6D, each of the pores 408 of the mesh 100 may have a substantially square shape, thus the length, $D_1$, and the width, $D_2$, thereof may be about equal. However, it of note that the shape of each of the pores 408 of the supporting structure 404 (whether a mesh or not) is not limited to a square, and may take on any suitable shape, such as those discussed herein. As such, the length, $D_1$, of each pore 408 may be greater than, about equal to, or less than the width, $D_2$, thereof. For instance, in an exemplary embodiment in which each pore 408 has a substantially rectangular shape, the length, $D_1$, of the each pores 408 may be about in the range from about 0.1 mm to about to about 10 cm, and the width, $D_2$, thereof may be about in the range from about 0.1 mm to about to about 10 cm, provided that $D_1$ is not about equal to $D_2$.

In some embodiments, each of the pores 408 of the mesh 602 may have a maximum length, width, and/or diameter that is at least one times that of the thickness of the mesh 602. In some embodiments, each of the pores 408 may have a maximum length, width, and/or diameter in a range from about 0.1 mm to about to about 10 cm.

In some embodiments, the average length, width, and/or diameter of the pores 408 may be at least one times that of the thickness of the mesh 602. In some embodiments, that average length, width, and/or diameter of the pores 408 may be in a range from about 0.1 mm to about 10 cm.

In some embodiments, the maximum pitch, $P_m$, (e.g., center-to-center distance) between each of the opposing and adjacent supporting elements 406b (and/or 406a) in the mesh 602 may be in a range from about 0.1 mm to about to about 20 cm, about 0.3 mm to about 10 cm, or about 0.5 mm to about 6 cm. In some embodiments, the maximum pitch, $P_m$, between each of the opposing and adjacent supporting elements 406b (and/or 406a) in the mesh 602 may be range including and between any two of the following: about 0.1 mm, about 0.2 mm, about 0.4 mm, about 0.6 mm, about 0.8 mm, about 1 mm, about 2 mm, about 4 mm, about 6 mm, about 8 mm, about 1 cm, about 2 cm, about 3 cm, about 4 cm, about 5 cm, about 6 cm, about 7 cm, about 8 cm, about 9 cm, or about 10 cm, about 11 cm, about 12 cm, about 13 cm, about 14 cm, about 15 cm, about 16 cm, about 17 cm, about 18 cm, about 19 cm, and about 20 cm.

In some embodiments, an average pitch, $P_m$, (e.g., center-to-center distance) between opposing and adjacent supporting elements 406b (and/or 406a) in the mesh 602 may be in a range from about 0.1 mm to about to about 20 cm, about 0.3 mm to about 10 cm, or about 0.5 mm to about 6 cm. In some embodiments, an average pitch, $P_m$, between opposing and adjacent supporting elements 406b (and/or 406a) in the mesh may be range including and between any two of the following: about 0.1 mm, about 0.2 mm, about 0.4 mm, about 0.6 mm, about 0.8 mm, about 1 mm, about 2 mm, about 4 mm, about 6 mm, about 8 mm, about 1 cm, about 2 cm, about 3 cm, about 4 cm, about 5 cm, about 6 cm, about 7 cm, about 8 cm, about 9 cm, or about 10 cm, about 11 cm, about 12 cm, about 13 cm, about 14 cm, about 15 cm, about 16 cm, about 17 cm, about 18 cm, about 19 cm, and about 20 cm.

The mesh 602 may also comprise an average thickness, $t_{m1}$, in the non-intersection areas 606 (as shown, e.g., in FIG. 6C) that is about 75% to about 150% of an average thickness (or diameter), $t_s$, of the supporting elements 406a, 406b. In some embodiments, the mesh 602 may have an average thickness, $t_{m1}$, that is about 100% to about 150% of an average thickness (or diameter), $t_s$, of the supporting elements 406a, 406b. In some embodiments, the mesh 602 may have an average thickness, $t_{m1}$, in the non-intersection areas 606 that is about 100% of an average thickness (or diameter), $t_s$, of the supporting elements 406a, 406b. In some embodiments, the mesh 602 may have an average thickness, $t_{m1}$, in the non-intersection areas 606 that is about 125% of an average thickness (or diameter), $t_s$, of the supporting elements 406a, 406b. In some embodiments, the mesh 602 may have an average thickness, $t_{m1}$, in the non-intersection areas 606 that is about 150% of an average thickness (or diameter), $t_s$, of the supporting elements 406a, 406b.

The mesh 602 may also comprise an average thickness, $t_{m2}$, in the intersection areas 604 (as shown, e.g., in FIG. 6D) that is about 75% to about 150% of the average, combined thickness (or diameter) of both supporting elements 406a, 406b in said intersection areas 604. In some embodiments, the mesh 602 may have an average thickness, $t_{m2}$, that is about 75% to about 150% of an average thickness (or diameter) of both supporting elements 406a, 406b in the intersection areas 604. In some embodiments, the mesh 602 may have an average thickness, $t_{m2}$, that is about 75% of an average thickness (or diameter) of both supporting elements 406a, 406b in the intersection areas 604. In some embodiments, the mesh 602 may have an average thickness, $t_{m2}$, that is about 100% of an average thickness (or diameter) of both supporting elements 406a, 406b in the intersection areas 604. In some embodiments, the mesh 602 may have an average thickness, $t_{m2}$, that is about 125% of an average thickness (or diameter) of both supporting elements 406a, 406b in the intersection areas 604. In some embodiments, the mesh 602 may have an average thickness that is about 150% of an average thickness (or diameter) of both supporting elements 406a, 406b in the intersection areas 604.

In some embodiments, the mesh 602 may have an average thickness in the intersection areas 604 and the non-intersection areas 606 that are independently in a range from about from about 30 μm to about 10 mm, about 50 μm to about 6 mm, or from about 100 μm to about 2 mm, provided that the average thickness of the mesh 602 in the intersection areas 604 is about equal to or greater than the average thickness of the mesh in the non-intersection areas 606. In some embodiments, the mesh 602 may have an average thickness in the intersection areas 604 and the non-intersection areas 606 that are independently in a range including and between any two of the following: about 30 μm, about 50 μm, about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, and about 10 mm.

In some embodiments, each of the supporting elements 406a, 406b in the mesh 602 may independently have a thickness (or diameter), $t_s$, that is less than, about equal to, or greater than the average thickness (or diameter) of the nanofibers 402. In some embodiments, each of the supporting elements 406a, 406b in the mesh 602 may independently have a thickness (or diameter), $t_s$, that is less than the average thickness (or diameter) of the nanofibers 402. In some embodiments, each of the supporting elements 406a, 406b in the mesh 602 may independently have a thickness (or diameter), $t_s$, that is about equal to the average thickness (or diameter) of the nanofibers 402. In some embodiments, each of the supporting elements 406a, 406b in the mesh 602 may independently have a thickness (or diameter), $t_s$, that is greater than the average thickness (or diameter) of the nanofibers 402.

In some embodiments, each of the supporting elements 406a, 406b in the mesh 602 may independently have a thickness (or diameter), $t_s$, that is at least about one times that of the average thickness (or diameter) of the nanofibers 402. In some embodiments, each of the supporting elements 406a, 406b in the mesh 602 may independently have a thickness (or diameter), $t_s$, that is at least two times that of the average thickness (or diameter) of the nanofibers 402.

In some embodiments, each of the supporting elements 406a, 406b in the mesh 602 may independently have thickness (or diameter), $t_s$, that is in a range from about 30 μm to about 10 mm, about 50 μm to about 6 mm, or from about 100 μm to about 2 mm. In some embodiments each of the supporting elements 406a, 406b in the mesh 602 may independently have a thickness (or diameter), $t_s$, in a range including and between any two of the following: about 30 μm, about 50 μm, about 100 μm, about 150 rpm, about 200 μm, about 250 μm, about 300 rpm, about 350 μm, about 400 μm, about 450 μm, about 500 μm, about 550 μm, about 600 μm, about 650 μm, about 700 rpm, about 750 μm, about 800 μm, about 850 μm, about 900 μm, about 950 μm, about 1 mm, about 1.5 mm, about 2 mm, about 2.5 mm, about 3 mm, about 4 mm, about 5 mm, about 6 mm, about 7 mm, about 8 mm, about 9 mm and about 10 mm.

In some embodiments, the thickness (or diameter), $t_s$, of the supporting elements 406a, 406b of the mesh 602 may average at least about one times that of the average thickness (or diameter) of the nanofibers 402. In some embodiments, the thickness (or diameter), $t_s$, of the supporting elements 406a, 406b of the mesh 602 may average at least about two times that of the average thickness (or diameter) of the nanofibers 402. In some embodiments, the thickness (or diameter), $t_s$, of the supporting elements 406a, 406b of the mesh 602 may average in a range from about 30 μm to about 10 mm, about 50 μm to about 6 mm, or from about 100 μm to about 2 mm.

Figure 6E:
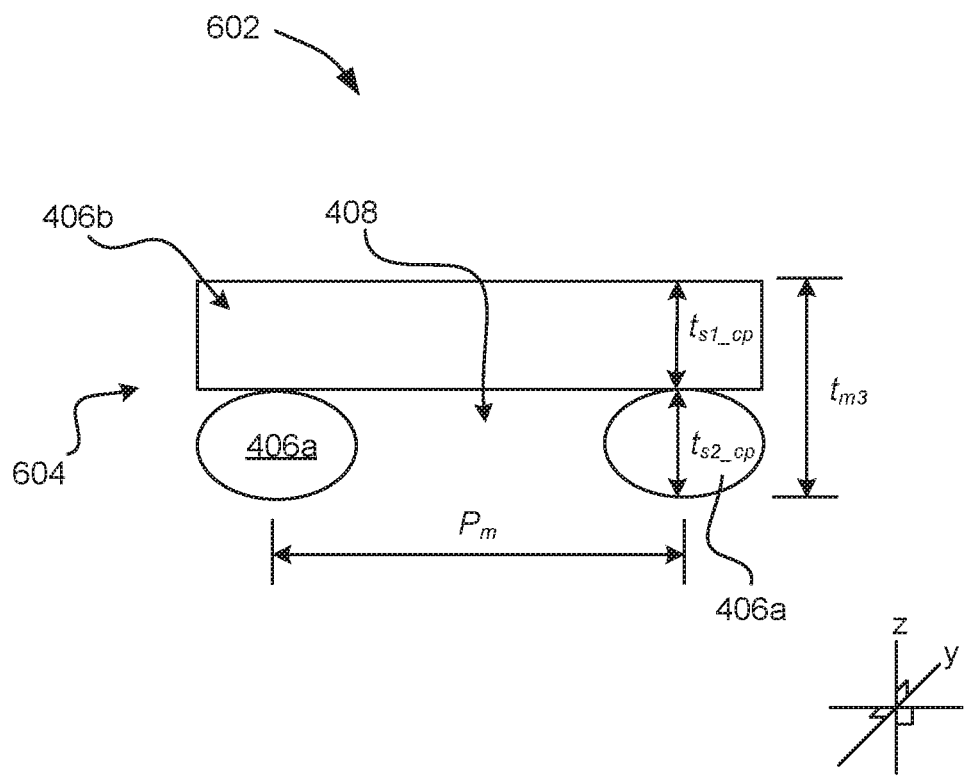

In some embodiments, the mesh 602 may be subjected to a compaction process as described herein, including but not limited to calendering. This compaction process, in some embodiments, may decrease the thickness of the supporting elements 406a, 406b and the overall thickness of the mesh 602 at least in the intersection areas 604. For instance, FIG. 6E provides an exploded, cross-sectional view of one pore 408 in the intersection areas 604 of the mesh 602 after a compaction process (where the nanofibers have again been omitted from the figure merely for clarity). As particularly shown in FIG. 6E, after the compaction process, each of the supporting elements 406a, 406b at least in the intersection areas 604 may independently have a thickness, $t_{s2}$, that is less than its respective thickness, $t_s$, prior to said compaction process. In some embodiments, after the compaction process, each of the supporting elements 406a, 406b at least in the intersection areas 604 may independently have a thickness, $t_{s2}$, that is about 100% to about 30% of its respective thickness, $t_s$, prior to said compaction process.

As also shown in FIG. 6E, after the aforementioned compaction process, the mesh 602 at least in the intersection areas 604 may have a thickness, $t_{m3}$, that is less than its respective thickness, $t_{m2}$, prior to said compaction process. In some embodiments, after the compaction process, the mesh 602 at least in the intersection areas 604 may have a thickness, $t_{m3}$, that is about 100% to about 30% of its respective thickness, $t_{m2}$, prior to said compaction process.

Figure 6F:
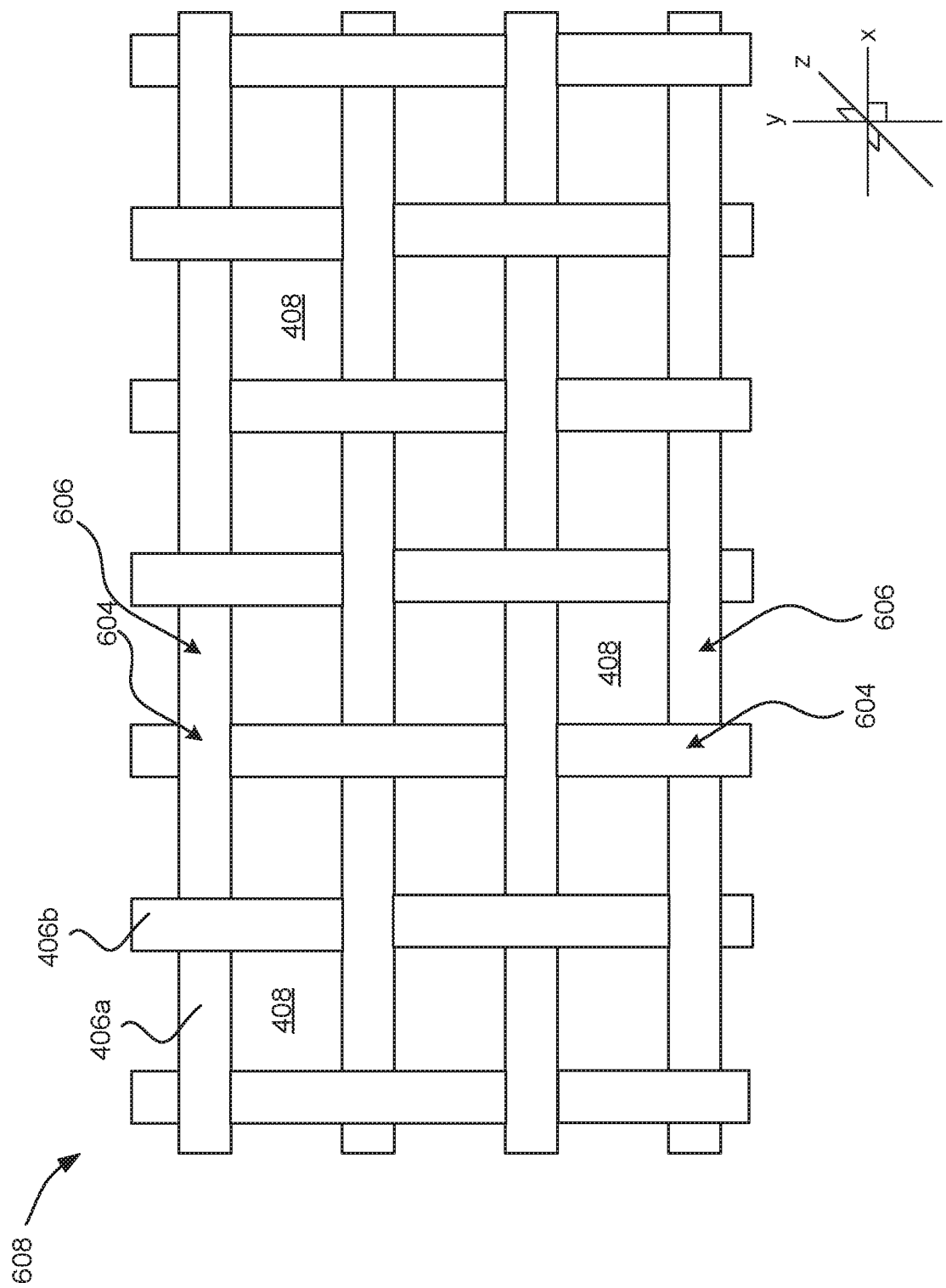
Figure 6G:
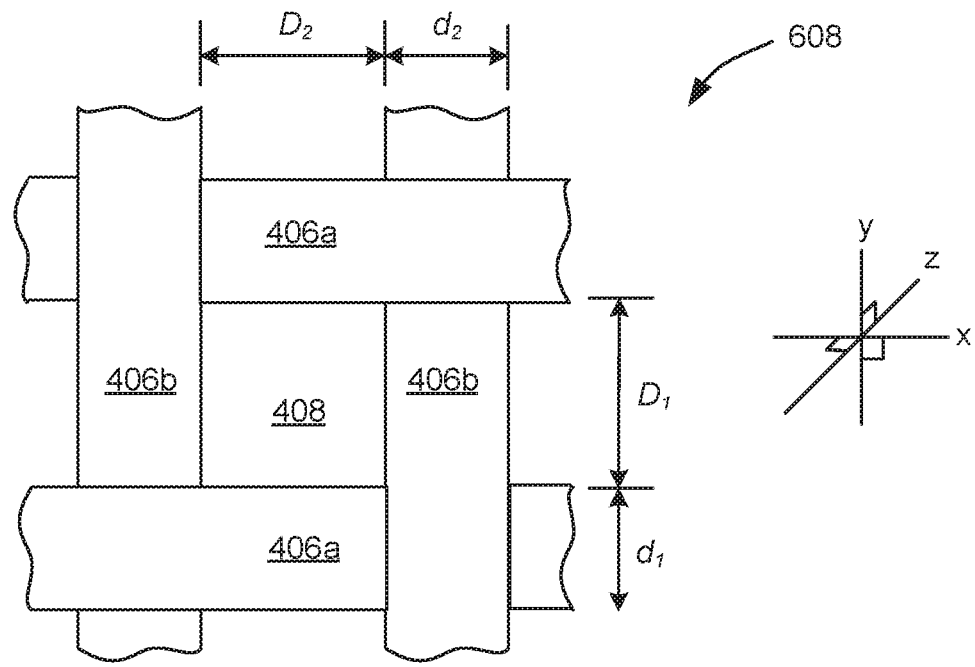
Figure 6H:
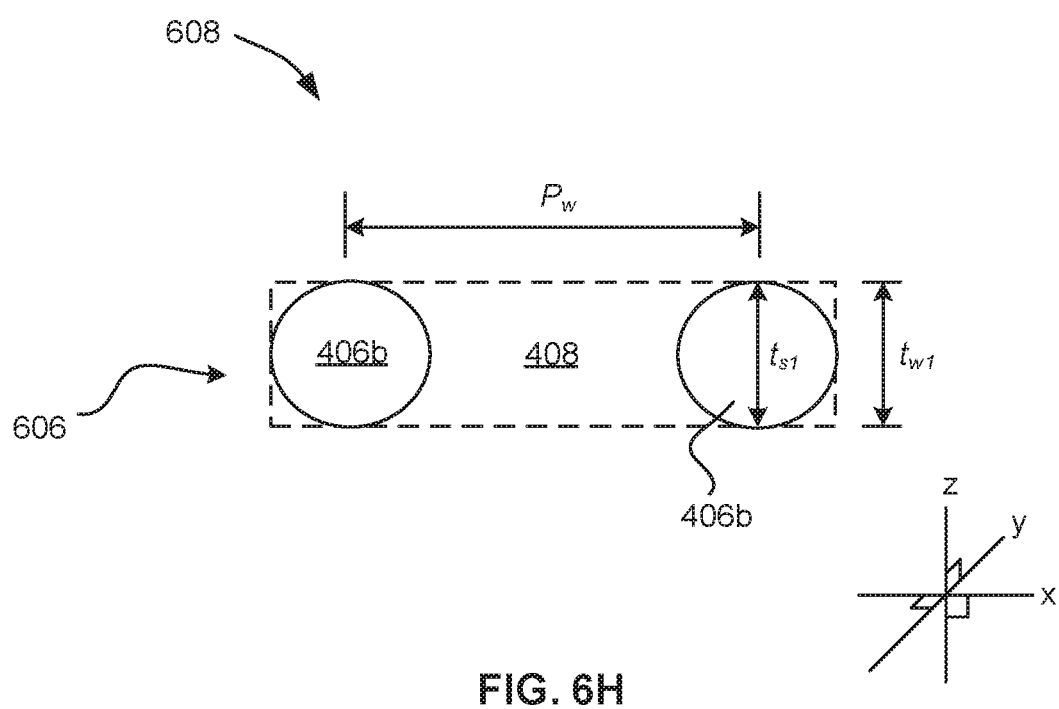
Figure 6I:
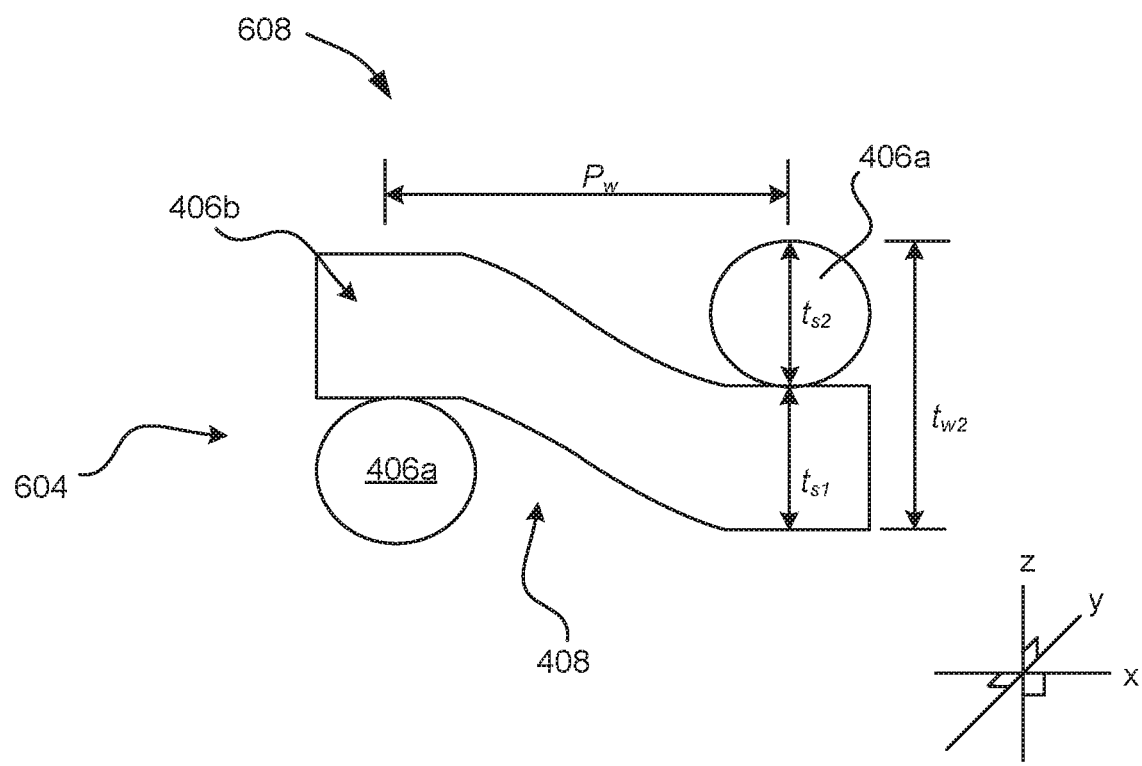

With continued reference to FIG. 4, the supporting structure 404 may be a woven structure, in some embodiments. FIG. 6F provides a top down view of the porous sheet 400 having such a woven structure 608. In the embodiment of FIG. 6F each pore 408 of the woven structure 608 may have a substantially square cross-sectional shape defined by two pairs of opposing and parallel support members 406a, 406b (where said cross-section is taken perpendicular to the z-axis of FIG. 6F). An exploded, top down view of a single pore 408 of the woven structure 608 is provided in FIG. 6G, and exploded side views of said pore 408 are provided in FIGS. 6H-6I. It is of note that the plurality of nanofibers 402 is not shown in FIGS. 6F-6I merely for clarity.

Figure 6J:
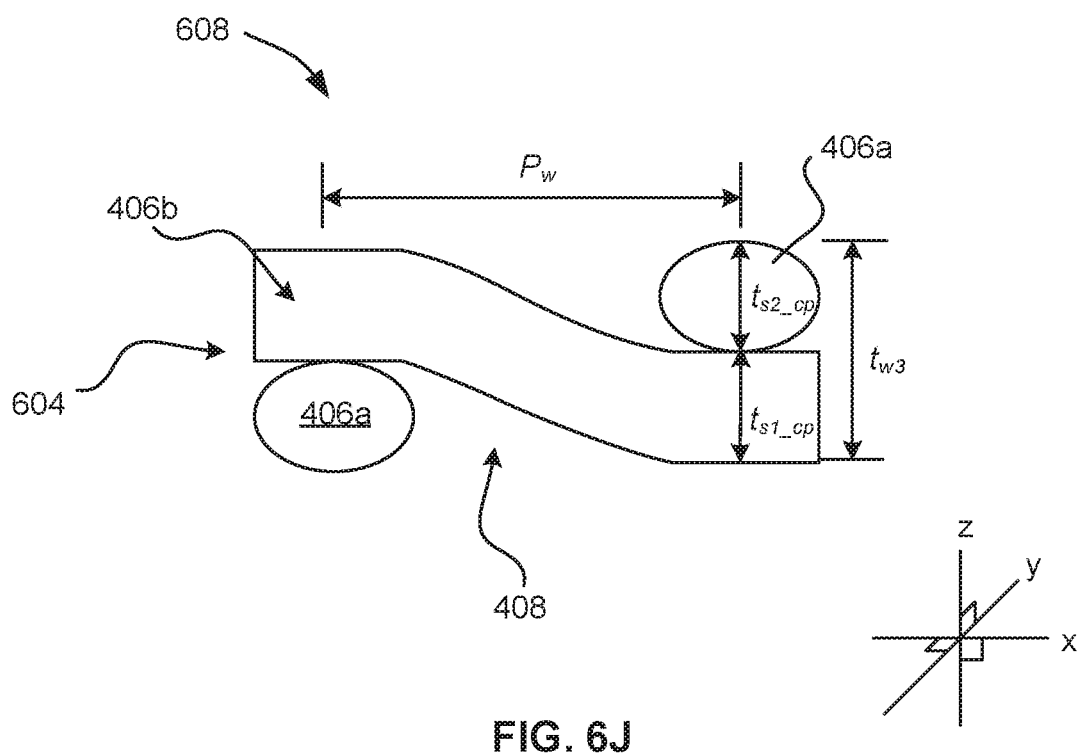

As discussed above with respect to the mesh structure 602, the woven structure 608 may also be subjected to a compaction process as described herein (e.g., calendering) in some embodiments. This compaction process, in some embodiments, may decrease the thickness of the supporting elements 406a, 406b and the overall thickness of the woven structure 608, at least in the intersection areas 604. For instance, FIG. 6J provides an exploded, cross-sectional view of one pore 408 in the intersection areas 604 of the woven structure 608 after a compaction process (where the nanofibers have again been omitted from the figure merely for clarity). As particularly shown in FIG. 6J, after the compaction process, each of the supporting elements 406a, 406b at least in the intersection areas 604 may independently have a reduced thickness, $t_{s2}$. In some embodiments, after the compaction process, each of the supporting elements 406a, 406b at least in the intersection areas 604 may independently have a thickness, $t_{s2}$, that is about 100% to about 30% of its respective thickness, $t_s$, prior to said compaction process.

As also shown in FIG. 6J, after the aforementioned compaction process, the woven structure 608 at least in the intersection areas 604 may have a reduced thickness, $t_{m3}$. In some embodiments, after the compaction process, the woven structure 608 at least in the intersection areas 604 may have a thickness, $t_{m3}$, that is about 100% to about 30% of its respective thickness, $t_{m2}$, prior to said compaction process.

It is of note that the woven structure 608 of FIGS. 6F-6J represents a variation of the mesh 602 described in FIGS. 6A-6E, where the same or similar components and features are given the same reference number. Accordingly, the dimensions (e.g., $D_1$, $D_2$, $d_1$, $d_2$, $t_s$, $t_{s2}$, pore size, and/or pore shape, etc.) of the woven structure 608 of FIGS. 6F-6J may be substantially the same as described with reference to the mesh 602 of FIGS. 6A-6E. Moreover, the $P_w$, $t_{w1}$, $t_{w2}$, $t_{w3}$ dimensions of the woven structure 608 of FIGS. 6F-6J may respectively correspond to, and/or have substantially the same values as, the $P_m$, $t_{m1}$, $t_{m2}$, $t_{m3}$ dimensions of the mesh 602 of FIGS. 6A-6E.

With continued reference to FIG. 4, the plurality of nanofibers 402 define a second plurality of pores 410. In some embodiments, the average pore size of the pores 410 defined by the nanofibers 402 is smaller than the average pore size of the pores 408 defined by the supporting elements 406.

In some embodiments, each of the nanofibers 402 may independently have a diameter in a range from about 10 nm to about 900 nm. In some embodiments, each of the nanofibers 402 may independently have a diameter in a range including and between any two of the following: about 10 nm, about 20 nm, about 40 nm, about 60 nm, about 80 nm, about 100 nm, about 120 nm, about 140 nm, about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, about 620 nm, about 640 nm, about 660 nm, about 680 nm, about 700 nm, about 820 nm, about 840 nm, about 860 nm, about 880 nm, and about 900 nm.

In some embodiments, the average diameter of the nanofibers 402 may be in a range from about 10 nm to about 900 nm. In some embodiments, the average diameter of the nanofibers 402 may be in a range including and between any two of the following: about 10 nm, about 20 nm, about 40 nm, about 60 nm, about 80 nm, about 100 nm, about 120 nm, about 140 nm, about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, about 620 nm, about 640 nm, about 660 nm, about 680 nm, about 700 nm, about 820 nm, about 840 nm, about 860 nm, about 880 nm, and about 900 nm.

In some embodiments, a total volume of the plurality of nanofibers 402 is less than about 20% of a total volume of the porous sheet 400. In some embodiments, a total volume of the plurality of nanofibers 402 is less than about 20%, less than about 18%, less than about 16%, less than about 14%, less than about 12%, less than about 12%, less than about 10%, less than about 8%, less than about 6%, less than about 4%, or less than about 2% of the total volume of the porous sheet 400. In some embodiments, a total volume of the plurality of nanofibers 402 is less than about 20%, less than about 15%, or less than about 10% of the total volume of the porous sheet 400. In some embodiments, a total volume of the plurality of nanofibers 402 is less than about 20% of the total volume of the porous sheet 400. In some embodiments, a total volume of the plurality of nanofibers 402 is less than about 10% of the total volume of the porous sheet 400. In some embodiments, a total volume of the plurality of nanofibers 402 is less than about 5% of the total volume of the porous sheet 400.

In some embodiments, each of the nanofibers 402 may independently comprise a polymeric material. In some embodiments, each of the nanofiber 402 may independently comprise nylon, polyvinyl alcohol, polyvinylpyrrolidone, polyvinylidene fluoride, polystyrene, polypropylene, polyethylene, polyacrylonitrile, polyimide, poly(ethylene oxide), polyethylene terephthalate, polyvinyl chloride, polycarbonate, polyurethane, polysulfone, polyactic acid, polytetrafluoroethylene, polybenzoxazoles, poly-aramid, poly(phenylene sulfide), poly-phenylene terephthalamide, or polytetrafluoroethylene, or combinations thereof. Further, in some embodiments, each of the nanofibers 402 may comprise one or more polar functional groups. In some embodiments, the nanofibers 402 may comprise a material and/or properties as described, e.g., in U.S. 2016/0166959, which is herein incorporated by reference in its entirety.

In some embodiments, the nanofibers 402 may be prepared by a method including, but not limited to, electrospinning, melt blowing, gas blowing (e.g., air blowing, nitrogen blowing, etc.), force spinning, and combinations thereof.

In some embodiments, the nanofibers 402 may be substantially evenly distributed between opposing and adjacent (or parallel) supporting elements 406 and/or substantially evenly distributed between a first surface 412 and an opposing, second surface 414 of the porous sheet 400. In some embodiments, the nanofibers 402 may be substantially evenly distributed at least between opposing and adjacent (or parallel) supporting elements 406. In some embodiments, the nanofiber 402 may be substantially evenly distributed between the first surface 412 and the opposing, second surface 414 of the porous sheet 400. In some embodiments, the nanofibers 402 may be substantially evenly distributed between opposing and adjacent (or parallel) supporting elements 406, and substantially evenly distributed between the first surface 412 and the opposing, second surface 414 of the porous sheet 400 as shown, e.g., in FIG. 4.

Figure 7A:
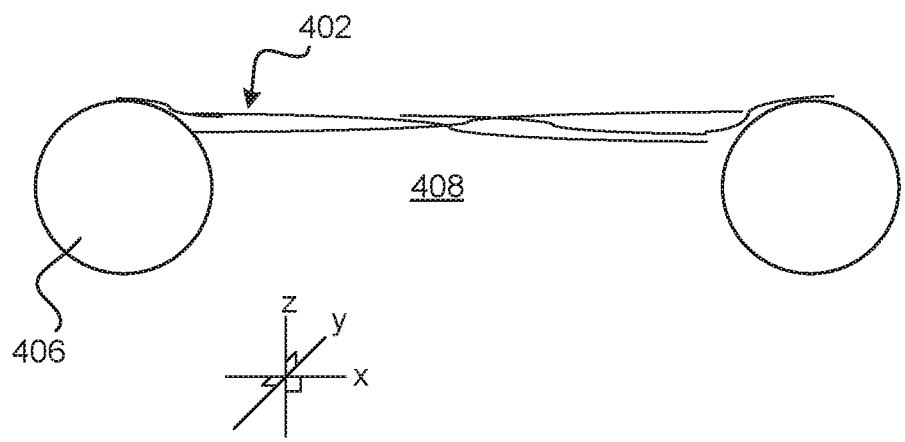
FIGS. 7A-7C show cross-sectional views of various distributions of nanofibers within a pore of a porous sheet, as described herein, according to some embodiments.

In some embodiments, the nanofibers 402 may not be evenly distributed between opposing and adjacent (or parallel) supporting elements 406, and/or may not be substantially evenly distributed between the first surface 412 and the opposing, second surface 414 of the porous sheet 400. For instance, FIG. 7A provides an embodiment in which at least about 85%, about 90%, about 95%, or about 100% of the nanofibers 402 are present closer to the first surface 412 rather than the opposite, second surface 414 of the porous sheet 400.

Figure 7B:
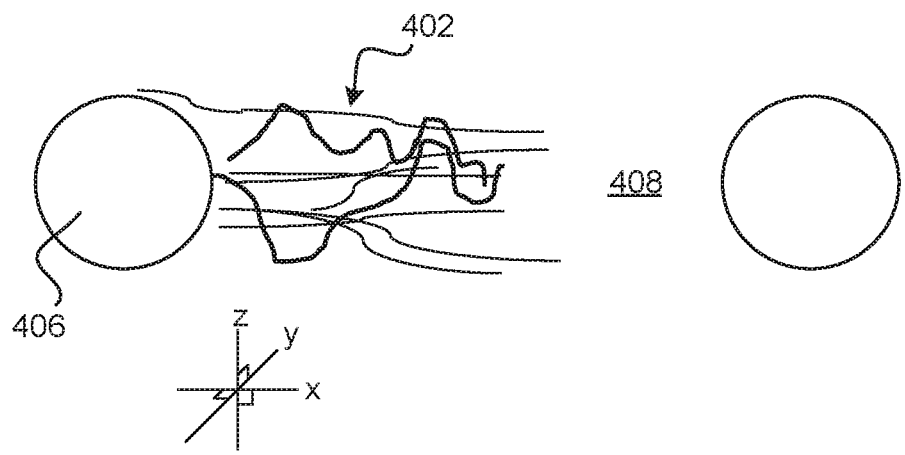

FIG. 7B provides an embodiment in which the nanofibers 402 are not evenly distributed between opposing and adjacent (or parallel) supporting elements 406. As particularly shown in FIG. 7B, the nanofibers 402 are disposed/distributed substantially on one side of the pore 408.

Figure 7C:
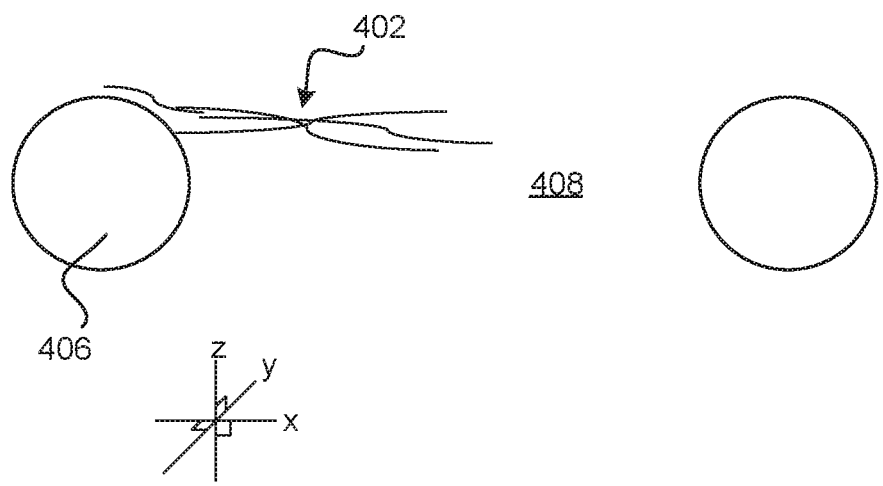

FIG. 7C provides an embodiment in which the nanofibers 402 are not evenly distributed between opposing and adjacent (or parallel) supporting elements 406 and not substantially evenly distributed between the first surface 412 and the opposing, second surface 414 of the porous sheet 400.

It is of note that, in some embodiments, each of the pores 408 of the porous sheet 400 may independently comprise a particular distribution of the nanofibers 402 as described herein. Stated another way, each of the pores 408 may independently comprise nanofibers 402 that are, or are not, substantially evenly distributed between opposing and adjacent (or parallel) supporting elements 406 of the respective pore 408, and/or are, or are not, substantially evenly distributed between the first surface 412 and the opposing, second surface 414 of the porous sheet 400. For instance, in some embodiments, the porous sheet 400 may comprise any combination of the following:

i) one or more pores 408 in which the nanofibers 402 are substantially evenly distributed between opposing and adjacent (or parallel) supporting elements 406 of the respective pore(s) 408;

ii) one or more pores 408 in which the nanofibers 402 are substantially even distributed between the first surface 412 and the opposing, second surface 414 of the porous sheet 400;

iii) one or more pores 408 in which the nanofibers 402 are substantially even distributed between opposing and adjacent (or parallel) supporting elements 406 of the respective pore(s) 408, and substantially even distributed between the first surface 412 and the opposing, second surface 414 of the porous sheet 400;

iv) one of more pores 408 having a nanofiber 402 distribution as shown in FIG. 7A;

v) one or more pores 408 having a nanofiber 402 distribution as shown in FIG. 7B; and/or vi) one or more pores 408 having a nanofiber 402 distribution as shown in FIG. 7C.

In some embodiments, a solid volume fraction (SVF) of the nanofibers 402 may be less than about 20%, less than about 10%, or less than about 5%. In some embodiments, a solid volume fraction of the nanofibers 402 may be less than about 20%, less than about 18%, less than about 16%, less than about 14%, less than about 12%, less than about 10%, or less than about 8%. In some embodiments, the solid volume fraction of the nanofibers 402 may be less than about 20%. In some embodiments, the solid volume fraction of the nanofibers 402 may be less than about 10%. In some embodiments, the solid volume fraction of the nanofibers 402 may be less than about 5%.

Figure 8A:
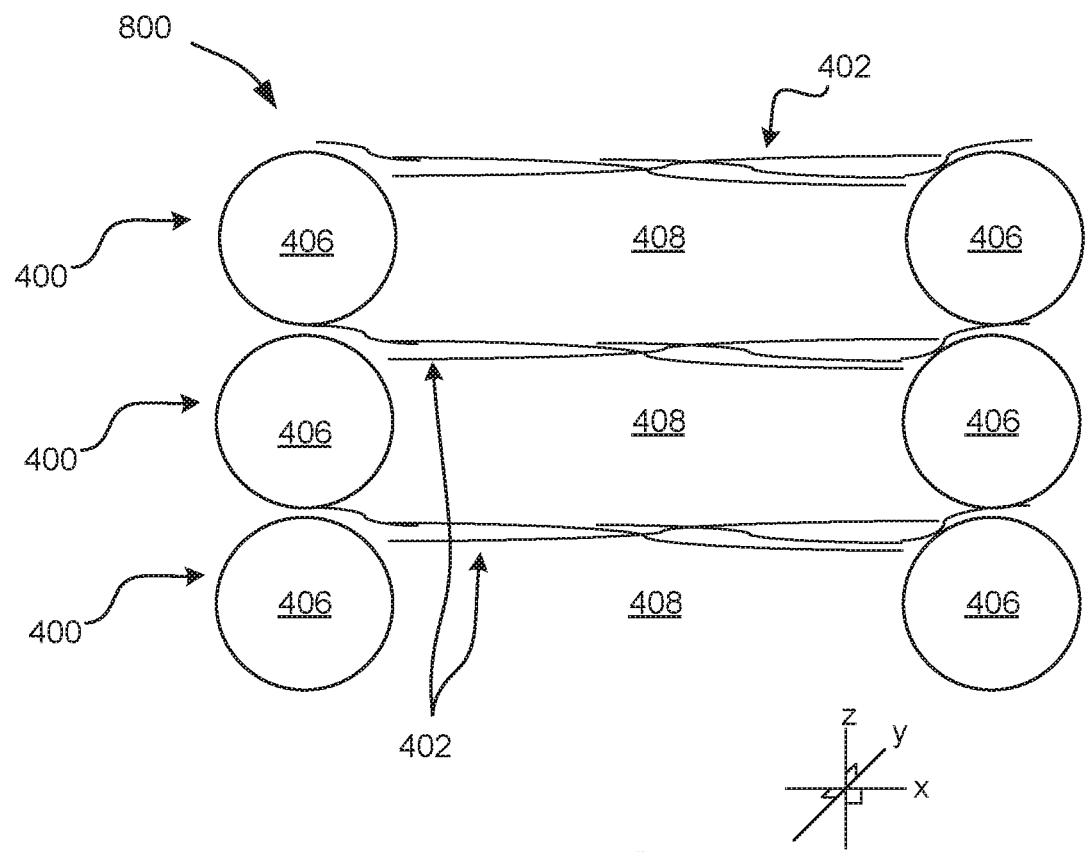
FIGS. 8A-8B show cross-sectional views of multilayer structures comprising at least three vertically arranged/oriented porous sheets, as described herein, according to some embodiment.
Figure 8B:
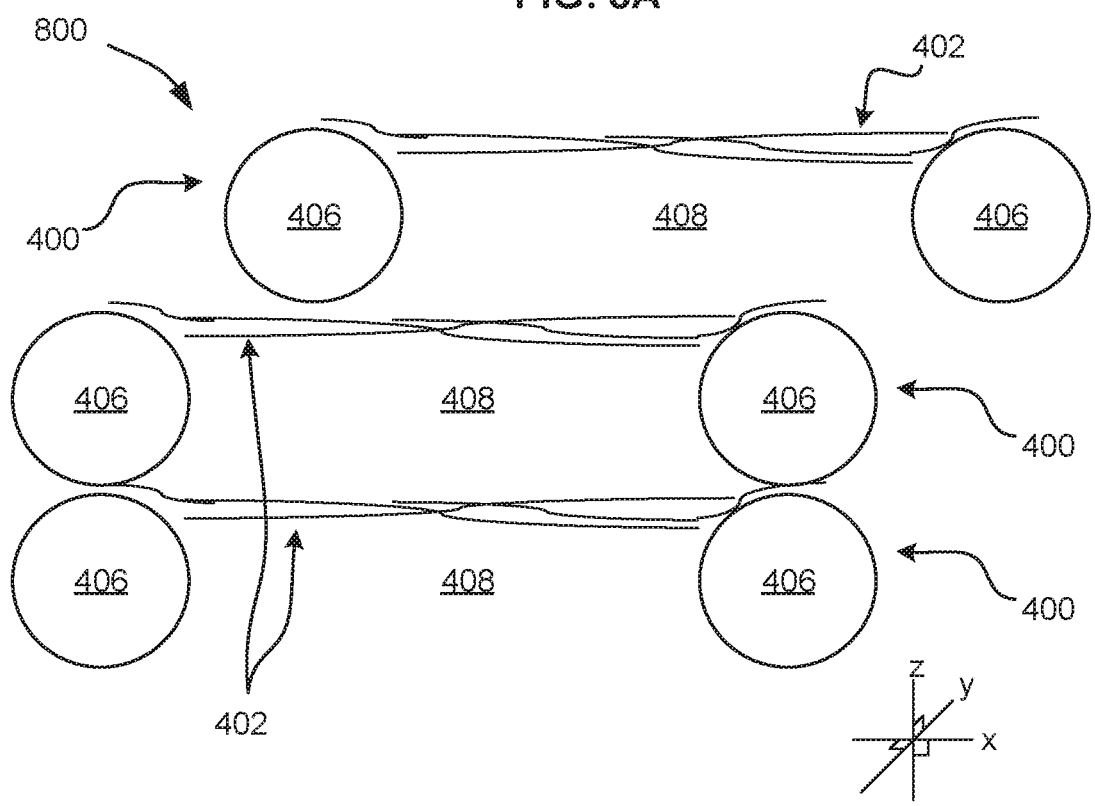

In some embodiments, the porous sheet 400 may be positioned near (e.g., above, below, to a side of) one or more additional porous sheets 400. For instance, FIGS. 8A-8B show exemplary embodiments of a multilayer structure 800 comprising at least three porous sheets 400 vertically arranged relative to one another. It is of note that a single pore 408 of each porous sheet 400 in the multilayer structure 800 is shown merely for clarity. It also of note that the pores 408 within each porous sheet 400 are not limited to the nanofiber 402 distribution shown in FIGS. 8A-8B, but rather may each independently have any nanofiber 402 distribution as described herein. Further, the multilayer structure 800 is not limited to three porous sheets 400, but rather may have any desired number of said sheets, such as at least two porous sheets 400, at least three porous sheets 400, at least four porous sheets 400, at least five porous sheets 400, at least six porous sheets 400, at least seven porous sheets 400, etc.

In some embodiments, the pores 408 of each porous sheet 400 in the multilayer structure 800 may be aligned with each other, as shown in FIG. 8A. However, in some embodiments, one or more of the pores 408 of at least two porous sheets 400 in the multilayer structure 800 may not be aligned with each other, as shown in FIG. 8B.

Figure 9:
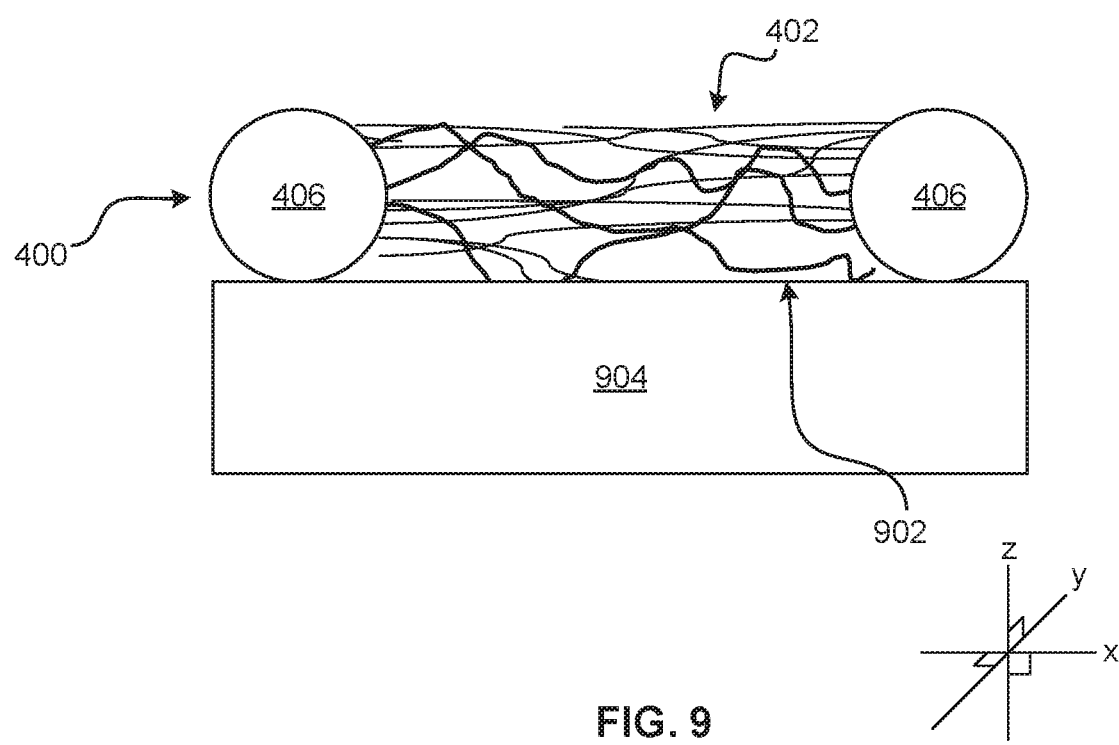
FIG. 9 shows a cross-sectional view of a porous structure in contact with a surface of a substrate, according to one embodiment.

In some embodiments, one or more porous sheets 400 may be positioned on a surface of a substrate. FIG. 9 provides one such exemplary embodiment in which at least one porous sheet 400 is positioned on an upper surface 902 of a substrate 904. In some embodiments, the substrate 904 may be a fibrous medium, membrane structures, and combinations thereof.

Figure 10:
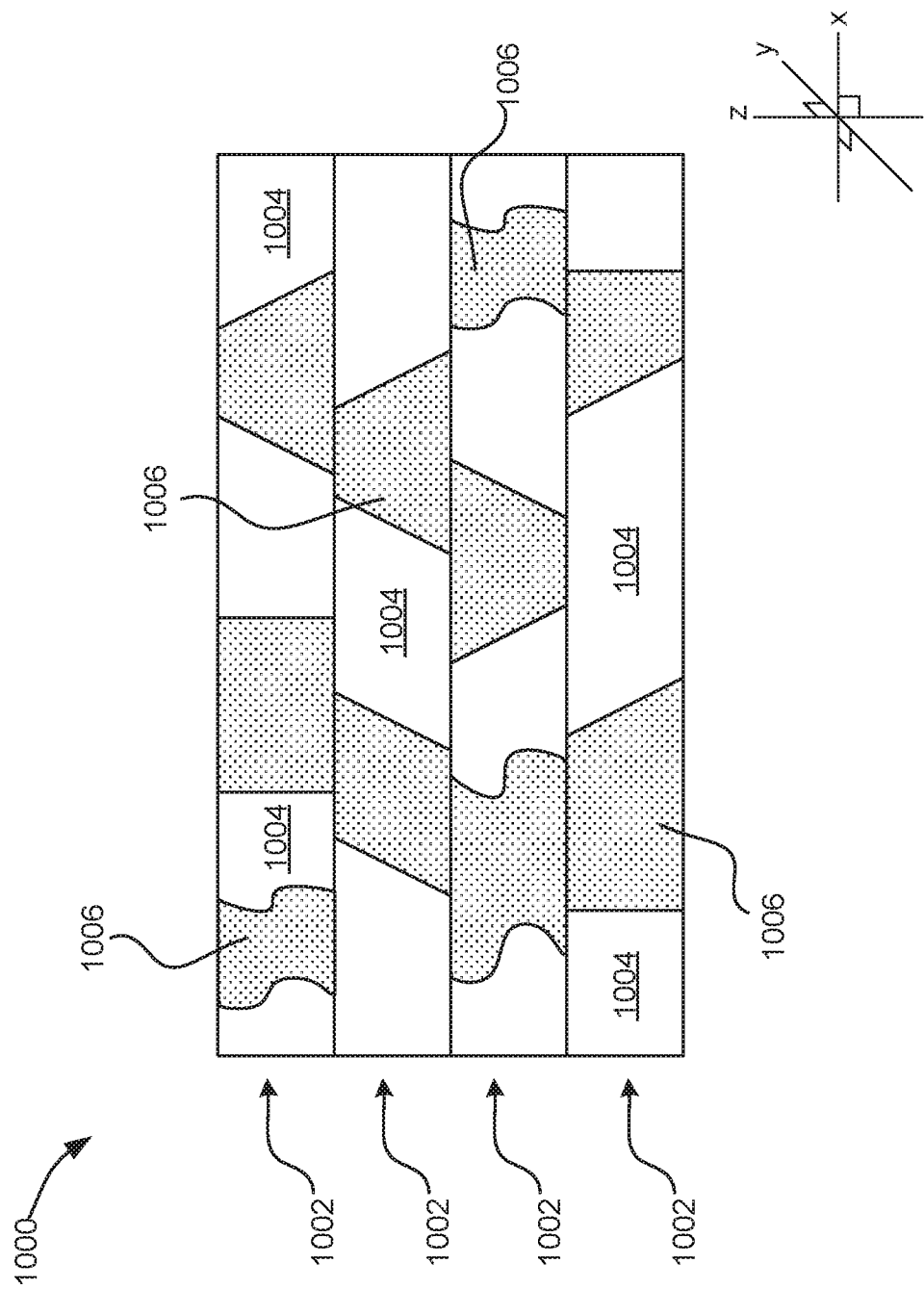
FIG. 10 shows a cross-sectional view of a multilayer structure comprising four vertically arranged/oriented porous layers, according to one embodiment.

Referring now to FIG. 10, a cross-sectional view of a multilayer structure 1000 is shown according to another exemplary embodiment. The multilayer structure 1000 or components/features thereof may be implemented in combination with, or as an alternative to, other devices/features/components described herein, such as those described with reference to other embodiments and FIGS. The multilayer structure 1000 may additionally be utilized in any of the methods for making and/or using such devices/components/features described herein. The multilayer structure 1000 may also be used in various applications and/or in permutations, which may or may not be noted in the illustrative embodiments described herein. For instance, the multilayer structure 1000 may include more or less features/components than those shown in FIG. 10, in some embodiments. Moreover, the multilayer structure 1000 is not limited to the size, shape, number of components/features, etc. specifically shown in FIG. 10.

As shown in FIG. 10, the multilayer structure 1000 may comprise four porous layers 1002 vertically arranged relative to one another. It is again of note that the multilayer structure 1000 is not limited to four porous layers 1002, but rather may have any desired number of said layers, such as at least two porous layers 1002, at least three porous layers 1002, at least four porous layers 1002, at least five porous layers 1002, at least six porous layers 1002, at least seven porous layers 1002, etc.

In some embodiments, each layer 1002 may independently comprise a porous material 1004 having a total volume that is less than about 30% to about 50% of the total volume of said layer. In some embodiments, each layer 1002 may independently comprise a porous material 1004 having a total volume that is less than about 30%, less than about 32%, less than about 34%, less than about 36%, less than about 38%, less than about 40%, less than about 42%, less than about 44%, less than about 46%, less than about 48%, or less than about 50% of the total volume of said layer. In some embodiments, each layer 1002 may independently comprise a porous material 1004 having a total volume that is less than about 30%, less than about 40%, or less than about 50% of the total volume of said layer. In some embodiments, a total volume of the porous material 1004 of each layer 1002 may be less than about 30% of the total volume of said layer. In some embodiments, a total volume of the porous material 1004 of each layer 1002 may be less than about 40% of the total volume of said layer. In some embodiments, a total volume of the porous material 1004 of each layer 1002 may be less than about 50% of the total volume of said layer.

In some embodiments, the porous material 1004 of each layer 1002 may comprise one or more pores 1006. Each of the pores 1006 may independently have a cross-sectional shape as exemplified in FIGS. 5A-5H, such as a rectangle (FIG. 5A), a triangle (FIG. 5B), a parallelogram (FIG. 5C), an echelon (FIG. 5D), a hexagon (FIG. 5E), an octagon (FIG. 5F), a circle (FIG. 5G), a square (FIG. 5H), or an irregular shape (not shown).

In some embodiments, the porous material 1004 of each layer 1002 may independently be comprised of a woven or non-woven material. In some embodiments, the porous material 1004 of at least one of the layers 1002 may be comprised of a woven material. In some embodiments, the porous material 1004 of each of the layers 1002 may be comprised of a woven material. In some embodiment, the porous material 1004 of at least one of the layers 1002 may be comprised of a non-woven material. In some embodiment, the porous material 1004 of each of the layers 1002 may be comprised of a non-woven material.

In some embodiments, non-woven material disclosed herein may be prepared by a method including, but not limited to, spun bonding, melt blowing, needle punching, air-laying, spunlacing, and combinations thereof.

In some embodiments, the layers 1002 of the multilayer structure 1000 may each independently be a porous sheet 400 as described, e.g., in FIG. 4.

While not shown in FIG. 10, a plurality of nanofibers may be disposed within at least a portion of the porous material 1004 of at least one of the layers 1002. For instance, in some embodiments, a plurality of nanofibers may be disposed within at least one of the pores 1006 of at least one of the layers 1002. In some embodiments, a plurality of nanofibers may be disposed with each of the pores 1006 of at least one of the layers 1002. In some embodiments, a plurality of nanofibers may be disposed within at least one of the pores 1006 of each of the layers 1002. In some embodiments, a plurality of nanofibers may be disposed within each of the pores 1006 of each of the layers 1002.

In some embodiments, for each layer 1002 that comprises nanofibers, a total volume of the nanofibers may be less than about 20% of the total volume of said layer 1002. In some embodiments, for each layer 1002 that comprises nanofibers, a total volume of the nanofibers may be less than about 20%, less than about 18%, less than about 16%, less than about 14%, less than about 12%, less than about 12%, less than about 10%, less than about 8%, less than about 6%, less than about 4%, or less than about 2% of the total volume of said layer 1002. In some embodiments, for each layer 1002 that comprises nanofibers, a total volume of the nanofibers may be less than about 20%, less than about 10%, or less than about 5% of the total volume of said layer 1002. In some embodiments, for each layer 1002 that comprises nanofibers, a total volume of the nanofibers may be less than about 20% of the total volume of said layer 1002. In some embodiments, for each layer 1002 that comprises nanofibers, a total volume of the nanofibers may be less than about 10% of the total volume of said layer 1002. In some embodiments, for each layer 1002 that comprises nanofibers, a total volume of the nanofibers may be less than about 5% of the total volume of said layer 1002.

In some embodiments, for each layer 1002 that comprises nanofibers, a solid volume fraction (SVF) of the nanofibers in said layer 1002 may be less than about 20%, less than about 10%, or less than about 5%. In some embodiments, for each layer 1002 that comprises nanofibers, a solid volume fraction of the nanofibers in said layer 1002 may be less than about 20%, less than about 18%, less than about 16%, less than about 14%, less than about 12%, less than about 10%, or less than about 8%. In some embodiments, for each layer 1002 that comprises nanofibers, a solid volume fraction of the nanofibers in said layer 1002 may be less than about 20%. In some embodiments, for each layer 1002 that comprises nanofibers, a solid volume fraction of the nanofibers in said layer 1002 may be less than about 10%. In some embodiments, for each layer 1002 that comprises nanofibers, a solid volume fraction of the nanofibers in said layer 1002 may be less than about 5%.

In some embodiments, for each layer 1002 that comprises nanofibers, the nanofibers may be distributed in respective pore(s) 1006 according to any arrangement described herein.

In some embodiments, at least one of the layers 1002 may not comprise nanofibers.

Figure 11:
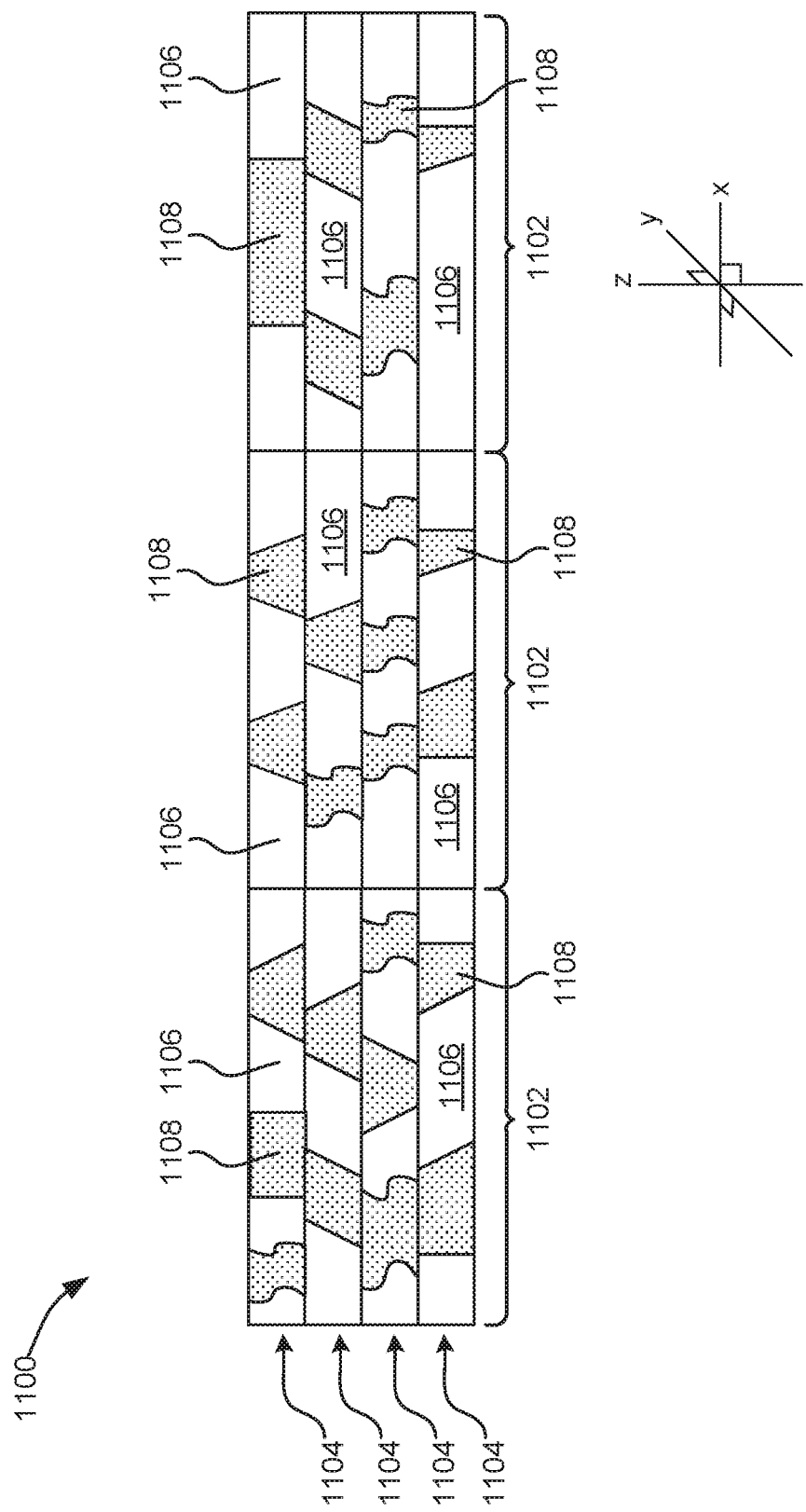
FIG. 11 shows a cross-sectional view of a multilayer structure comprising at least two horizontally arranged/oriented sections, where each section comprises at least two vertically arranged/oriented porous layers, as described herein, according to one embodiment.

Referring now to FIG. 11, a cross-sectional view of a multilayer structure 1100 is shown according to yet another exemplary embodiment. The multilayer structure 1100 or components/features thereof may be implemented in combination with, or as an alternative to, other devices/features/components described herein, such as those described with reference to other embodiments and FIGS. The multilayer structure 1100 may additionally be utilized in any of the methods for making and/or using such devices/components/features described herein. The multilayer structure 1100 may also be used in various applications and/or in permutations, which may or may not be noted in the illustrative embodiments described herein. For instance, the multilayer structure 1100 may include more or less features/components than those shown in FIG. 11, in some embodiments. Moreover, the multilayer structure 1100 is not limited to the size, shape, number of components/features, etc. specifically shown in FIG. 11.

As shown in FIG. 11, the multilayer structure 1100 may comprise at least three sections (or sub-areas) 1102 horizontally arranged relative to one another. Each section 1102 may comprise four porous layers 1104 vertically arranged relative to one another. It is of note that the multilayer structure 1100 is not limited to three sections 1102, but rather may have any desired number of sections, such as at least two sections 1102, at least three sections 1102, at least four sections 1102, at least five sections 1102, at least six sections 1102, at least seven sections 1102, etc. Moreover, it is also of note that each section 1102 is not limited to four vertically arranged porous layers 1104; rather, each section 1102 may independently comprise at least one porous layer 1104, at least two porous layers 1104, at least three porous layers 1106, at least four porous layers 1104, at least five porous layers 1104, at least six porous layers 1104, at least seven porous layers 1104, etc.

In some embodiments, each layer 1104 may independently comprise a porous material 1106 having a total volume that is less than about 30% to about 50% of the total volume of said layer. In some embodiments, each layer 1104 may independently comprise a porous material 1106 having a total volume that is less than about 30%, less than about 32%, less than about 34%, less than about 36%, less than about 38%, less than about 40%, less than about 42%, less than about 44%, less than about 46%, less than about 48%, or less than about 50% of the total volume of said layer 1104. In some embodiments, each layer 1104 may independently comprise a porous material 1106 having a total volume that is less than about 30%, less than about 40%, or less than about 50% of the total volume of said layer 1104. In some embodiments, a total volume of the porous material 1106 of each layer 1104 may be less than about 30% of the total volume of said layer 1104. In some embodiments, a total volume of the porous material 1106 of each layer 1104 may be less than about 40% of the total volume of said layer 1104. In some embodiments, a total volume of the porous material 1106 of each layer 1104 may be less than about 50% of the total volume of said layer 1104.

In some embodiments, the porous material 1106 of each layer 1104 may comprise one or more pores 1108. Each of the pores 1108 may independently have a cross-sectional shape as exemplified in FIGS. 5A-5H, such as a rectangle (FIG. 5A), a triangle (FIG. 5B), a parallelogram (FIG. 5C), an echelon (FIG. 5D), a hexagon (FIG. 5E), an octagon (FIG. 5F), a circle (FIG. 5G), a square (FIG. 5H), or an irregular shape (not shown).

In some embodiments, the porous material 1106 of each layer 1104 may independently be comprised of a woven or non-woven material. In some embodiments, the porous material 1106 of at least one of the layers 1104 may be comprised of a woven material. In some embodiments, the porous material 1106 of each of the layers 1104 may be comprised of a woven material. In some embodiment, the porous material 1106 of at least one of the layers 1104 may be comprised of a non-woven material. In some embodiment, the porous material 1106 of each of the layers 1104 may be comprised of a non-woven material.

In some embodiments, the layers 1104 may each independently be a porous sheet 400 as described, e.g., in FIG. 4.

While not shown in FIG. 11, a plurality of nanofibers may be disposed within at least a portion of the porous material 1106 of at least one of the layers 1104. For instance, in some embodiments, a plurality of nanofibers may be disposed within at least one of the pores 1108 of at least one of the layers 1104. In some embodiments, a plurality of nanofibers may be disposed with each of the pores 1108 of at least one of the layers 1104. In some embodiments, a plurality of nanofibers may be disposed within at least one of the pores 1108 of each of the layers 1104. In some embodiments, a plurality of nanofibers may be disposed within each of the pores 1108 of each of the layers 1104.

In some embodiments, for each layer 1104 that comprises nanofibers, a total volume of the nanofibers may be less than about 20% of the total volume of said layer 1104. In some embodiments, for each layer 1104 that comprises nanofibers, a total volume of the nanofibers may be less than about 20%, less than about 18%, less than about 16%, less than about 14%, less than about 12%, less than about 12%, less than about 10%, less than about 8%, less than about 6%, less than about 4%, or less than about 2% of the total volume of said layer 1104. In some embodiments, for each layer 1104 that comprises nanofibers, a total volume of the nanofibers may be less than about 20%, less than about 10%, or less than about 5% of the total volume of said layer 1104. In some embodiments, for each layer 1104 that comprises nanofibers, a total volume of the nanofibers may be less than about 20% of the total volume of said layer 1104. In some embodiments, for each layer 1104 that comprises nanofibers, a total volume of the nanofibers may be less than about 10% of the total volume of said layer 1104. In some embodiments, for each layer 1104 that comprises nanofibers, a total volume of the nanofibers may be less than about 5% of the total volume of said layer 1104.

In some embodiments, for each layer 1104 that comprises nanofibers, a solid volume fraction (SVF) of the nanofibers in said layer 1104 may be less than about 20%, less than about 10%, or less than about 5%. In some embodiments, for each layer 1104 that comprises nanofibers, a solid volume fraction of the nanofibers in said layer 1104 may be less than about 20%, less than about 18%, less than about 16%, less than about 14%, less than about 12%, less than about 10%, or less than about 8%. In some embodiments, for each layer 1104 that comprises nanofibers, a solid volume fraction of the nanofibers in said layer 1104 may be less than about 20%. In some embodiments, for each layer 1104 that comprises nanofibers, a solid volume fraction of the nanofibers in said layer 1104 may be less than about 10%. In some embodiments, for each layer 1104 that comprises nanofibers, a solid volume fraction of the nanofibers in said layer 1104 may be less than about 5%.

In some embodiments, for each layer 1104 that comprises nanofibers, the nanofibers may be distributed in respective pore(s) 1108 according to any arrangement described herein.

In some embodiments, at least one of the layers 1104 may not comprise nanofibers.

In some embodiments, each of the sections 1102 may be the same or different with respect to one or more of the following: the number of layers 1104; the number of pores 1108; the cross-sectional shape of the pores 1108; the number of pores 1108 with nanofibers; the arrangement/distribution of the nanofibers within the pores 1108; the composition, cross-sectional shape, and/or structure of the porous material 1106; and the solid volume fraction of the nanofibers per layer 1104.

Figure 12:
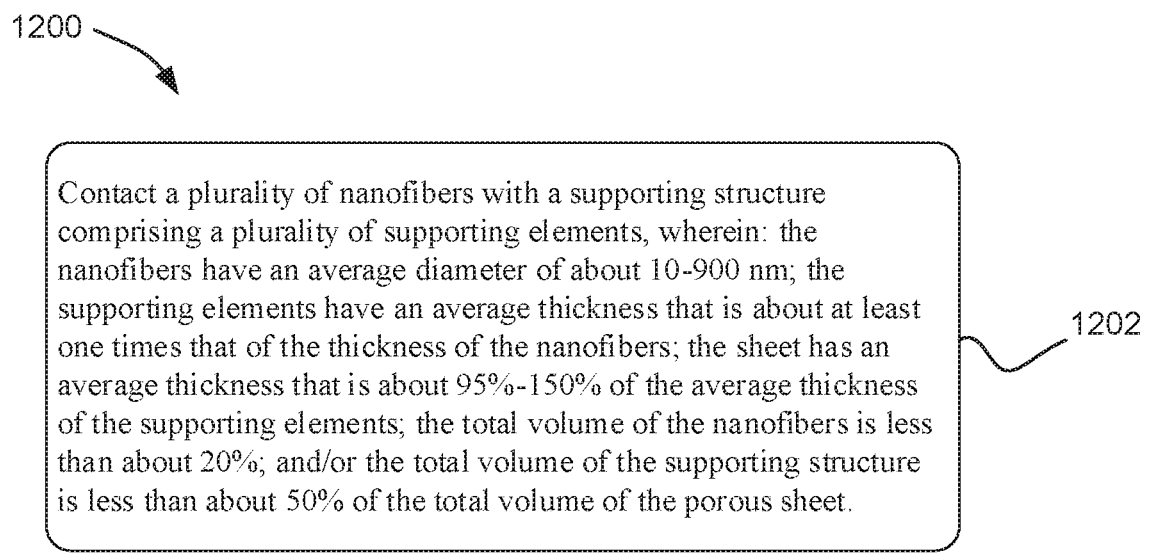
FIG. 12 shows a flowchart of a method for forming a porous sheet, as described herein, according to one embodiment.

Referring now to FIG. 12, a flowchart of an exemplary method 1200 for forming a fiber is shown according to one embodiment. The method 1200 may be implemented in conjunction with any of the features/components described herein, such as those described with reference to other embodiments and FIGS. The method 1200 may also be used for various applications and/or according to various permutations, which may or may not be noted in the illustrative embodiments/aspects described herein. For instance, the method 1200 may include more or less operations/steps than those shown in FIG. 12, in some embodiments.

As shown in FIG. 12, the method 1200 comprises contacting a plurality of nanofibers with a supporting structure comprising a plurality of supporting elements, wherein: the nanofibers have an average diameter of about 10 to about 900 nm; the supporting elements have an average thickness that is less than, about equal to, or greater than that of the thickness of the nanofibers; the porous sheet has an average thickness that is about 95% to about 150% of the average thickness of the supporting elements; the total volume of the nanofibers is less than about 20%, less than about 10%, or less than about 5%; and/or the total volume of the supporting structure is less than about 50%, less than about 40%, or less than about 30% of the total volume of the porous sheet. See step 1202.

In some embodiments, the supporting structure with which the nanofibers are in contact with has a shape of a mesh.

In some embodiments, prior to contacting the nanofibers with the supporting structure, the method 1200 may further comprise forming the nanofibers via electrospinning, melt blowing, gas blowing (e.g., air blowing, nitrogen blowing, etc.), force spinning, or combinations thereof.

Figure 13A:
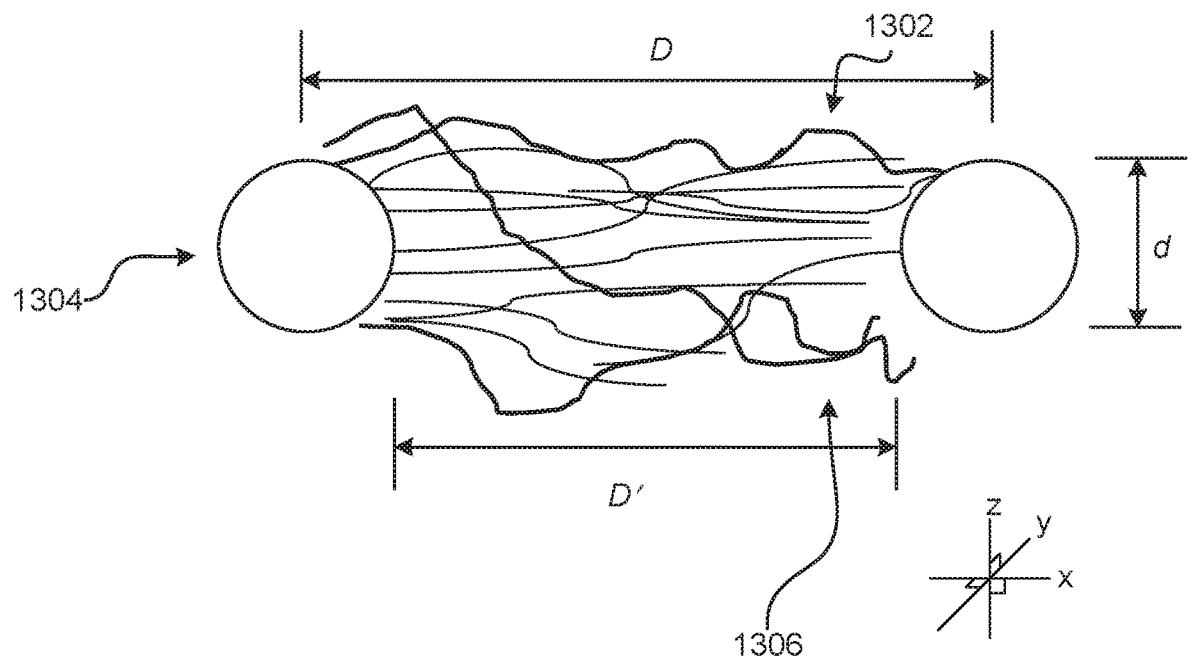
FIGS. 13A-13B show cross-sectional views of a plurality of nanofibers contacting a supporting structure of a porous sheet prior to and after, respectively, a compaction process (such as calendering), according to one embodiment.
Figure 13B:
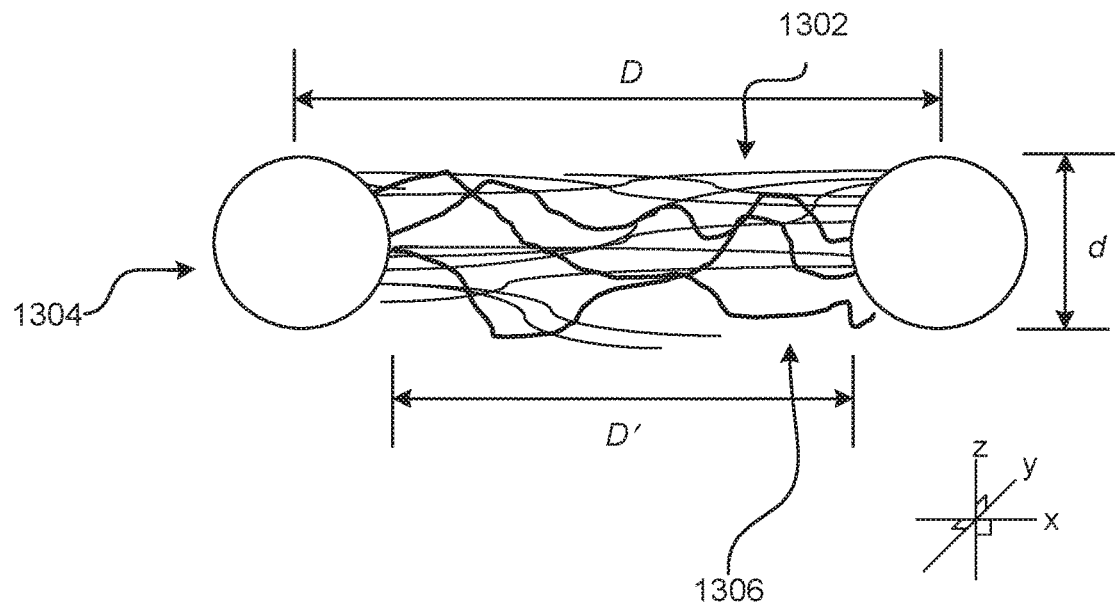

In some embodiments, after contacting the nanofibers with the supporting structure, the method 1200 may further comprise subjecting the resulting structure with a compaction process, such as calendering. FIGS. 13A-13B illustrate a plurality of nanofibers 1302 contacting a supporting structure 1304 prior to and after, respectively, such a compaction process. It is of note that a single pore 1306 of the supporting structure 1304 is shown merely for clarity.

In some embodiments, a solid volume fraction (SVF) of the nanofibers 1302, at least after the compaction process, may be less than about 20%, less than about 10%, or less than about 5%. The solid volume fraction of the nanofibers 1302 may be approximated by the ratio of the nanofiber 1302 volume to the effective volume of the supporting structure 1304. As shown in FIG. 13, the effective area of a pore 1306 may be equal to: D*d. In some embodiments, a solid volume fraction of the nanofibers 1302 may be less than about 20%, less than about 18%, less than about 16%, less than about 14%, less than about 12%, less than about 10%, or less than about 8%. In some embodiments, the solid volume fraction of the nanofibers 1302 may be less than about 20%. In some embodiments, the solid volume fraction of the nanofibers 1302 may be less than about 10%. In some embodiments, the solid volume fraction of the nanofibers 1302 may be less than about 5%.

In some embodiments, the porous sheets, multilayer structures, etc. described herein may be used in a variety of applications. In one exemplary embodiment, the porous sheets, multilayer structures, etc. described herein may be used as, in conjunction with, or be a part/component of, a filter (e.g., an air filter). In some embodiment, the porous sheets, multilayer structures, etc. described herein may be used as an air filter as described, e.g., in U.S. 2016/0166959, which is herein incorporated by reference in its entirety.

Unless otherwise defined, all technical and scientific terms used herein have the same meaning as commonly understood by one of ordinary skill in the art to which this invention belongs.

Throughout the present specification and claims, unless the context requires otherwise, the word "comprise" and variations thereof (e.g., "comprises" and "comprising") are to be construed in an open, inclusive sense, that is as "including, but not limited to." Additionally, the singular forms "a," "an" and "the" include plural referents unless the context clearly dictates otherwise.

Recitation of numeric ranges of values throughout the specification is intended to serve as a shorthand notation of referring individually to each separate value falling within the range inclusive of the values defining the range, and each separate value is incorporated in the specification as it were individually recited herein.

Reference to "about" a value or parameter herein includes (and describes) embodiments that are directed to that value or parameter per se. In some embodiments, the term "about" includes the indicated amount±10%.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In addition, where features or aspects of the invention are described in terms of Markush groups, those skilled in the art will recognize that the invention is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

The invention described and claimed herein is not to be limited in scope by the specific embodiments disclosed herein, as these embodiments are intended as illustrations of several aspects of the invention. Indeed, various modifications of the invention in addition to those shown and described herein will become apparent to those skilled in the art from the foregoing description. Such modifications include the substitution of known equivalents for any aspect of the invention in order to achieve the same result in substantially the same way. Such modifications are also intended to fall within the scope of the appended claims.

The invention claimed is:

1. A porous sheet comprising a nanofiber web comprising a plurality of nanofibers in contact with a supporting structure comprising a plurality of opposing and parallel supporting elements, wherein:
    the nanofibers have an average diameter of about 10-900 nm;
    the supporting elements have an average thickness of about 50-500 µm;
    the supporting structure has an average thickness of about 100-1000 µm;
    an average distance between adjacent parallel supporting elements is less than the average thickness of the supporting structure,
    the nanofiber web has an average thickness that is about 75°1%-150% of an average thickness of the supporting structure;
    a total volume of the nanofibers is less than about 10% of a total volume of the nanofiber web; and
    a total volume of the supporting structure is less than about 50% of the total volume of the porous sheet.

2. The porous sheet of claim 1, wherein at least about 30% of the total volume of the porous sheet is empty.

3. The porous sheet of claim 1, wherein the supporting structure has a shape of a mesh.

4. The porous sheet of claim 1, wherein the supporting structure has pores of a shape selected from a circle, a triangle, a parallelogram, an echelon, a hexagon, an octagon, and an irregular shape.

5. The porous sheet of claim 1, wherein the nanofibers comprise a polymer selected from the group consisting of nylon, polyvinyl alcohol, polyvinylpyrrolidone, poly vinylidene fluoride, polystyrene, polypropylene, polyethylene, polyacrylonitrile, polyimide, poly(ethylene oxide), polyethylene terephthalate, polyvinyl chloride, polycarbonate, polyurethane, polysulfone, polylactic acid, polytetrafluoroethylene, polybenzoxazoles, poly-aramid, poly(phenylene sulfide), poly-phenylene terephthalamide, polytetrafluoroethylene, and combinations thereof.

6. The porous sheet of claim 1, wherein the polymeric nanofiber web comprises a solid volume fraction less than 5%.

7. A method for forming a porous sheet of claim 1, the method comprising
    contacting a nanofiber web comprising a plurality of nanofibers with a supporting structure comprising a plurality of supporting elements.

8. The method of claim 7, wherein the nanofiber web is formed via electrospinning, melt blowing, gas blowing, or force spinning.

9. The method of claim 7, wherein the supporting elements are comprised of a metal material, a plastic material, a ceramic material, a fibrous material, or combinations thereof.

10. The method of claim 7, wherein the supporting structure has a shape of a mesh.

11. A multi-layer porous structure, comprising
    a plurality of the porous sheets of claim 1 vertically arranged relative to one another.

12. The multi-layer porous structure of claim 11, wherein the porous sheets each comprises pores, each pore independently having a shape selected from the group consisting of a circle, a triangle, a parallelogram, an echelon, a hexagon, an octagon, and an irregular shape.

13. The multi-layer porous structure of claim 11, comprising a plurality of the areas horizontally arranged relative to one another.

14. The multi-layer porous structure of claim 11, wherein the supporting structure of each layer is independently comprised of a woven or nonwoven material.

* * * * *